United States Patent
Holleman, III

(10) Patent No.: US 11,917,092 B2
(45) Date of Patent: Feb. 27, 2024

(54) SYSTEMS AND METHODS FOR DETECTING VOICE COMMANDS TO GENERATE A PEER-TO-PEER COMMUNICATION LINK

(71) Applicant: SYNTIANT, Irvine, CA (US)

(72) Inventor: Jeremiah H. Holleman, III, Irvine, CA (US)

(73) Assignee: SYNTIANT, Irvine, CA (US)

( * ) Notice: Subject to any disclaimer, the term of this patent is extended or adjusted under 35 U.S.C. 154(b) by 315 days.

(21) Appl. No.: 17/338,482

(22) Filed: Jun. 3, 2021

(65) Prior Publication Data

US 2021/0385319 A1  Dec. 9, 2021

Related U.S. Application Data

(60) Provisional application No. 63/195,909, filed on Jun. 2, 2021, provisional application No. 63/034,815, filed on Jun. 4, 2020.

(51) Int. Cl.
*H04M 1/27* (2006.01)
*H04M 1/27453* (2020.01)
(Continued)

(52) U.S. Cl.
CPC ........... *H04M 1/271* (2013.01); *G10L 15/083* (2013.01); *G10L 15/1815* (2013.01);
(Continued)

(58) Field of Classification Search
CPC ... G06F 3/167; G10L 15/083; G10L 15/1815; G10L 15/22; G10L 15/30;
(Continued)

(56) References Cited

U.S. PATENT DOCUMENTS 9,098,467 B1 8/2015 Blanksteen et al.
9,548,047 B2 * 1/2017 Clark ...................... G10L 25/84
(Continued)

OTHER PUBLICATIONS

PCT International Search Report and Written Opinion, PCT Application No. PCT/US21/35921, dated Sep. 16, 2021.

*Primary Examiner* — Tan H Trinh
(74) *Attorney, Agent, or Firm* — Rutan & Tucker LLP; Hani Z. Sayed; Ravi Mohan

(57) ABSTRACT

A voice-based peer-to-peer communication system may be used to detect voice commands from users to provide a wireless communication voice connection that allows the users to directly communicate with each other. The system may include a first computing device of a first user communicatively coupled to a second computing device of a second user over the wireless connection. The system may process the detected voice command having a phrase, contact name, and voice message. The phrase may include a wake, answer, or stop phrase. The contact name may be utilized to determine whether that contact name matches an entry within a predetermined contact list of the first user, where the matched contact name may be associated with the second user. Finally, the system may generate audio data based on the processed voice command that is then transmitted to the second computing device of the second user over the wireless connection.

20 Claims, 7 Drawing Sheets

(51) Int. Cl.
    *G10L 15/22*     (2006.01)
    *G10L 15/18*     (2013.01)
    *G10L 15/08*     (2006.01)
    *G10L 15/30*     (2013.01)

(52) U.S. Cl.
    CPC .............. *G10L 15/22* (2013.01); *G10L 15/30* (2013.01); *H04M 1/27453* (2020.01); *G10L 2015/088* (2013.01); *G10L 2015/223* (2013.01)

(58) Field of Classification Search
    CPC ........ G10L 2015/088; G10L 2015/223; H04M 1/271; H04M 1/27453; H04M 1/72436
    USPC .......................................................... 455/563
    See application file for complete search history.

(56) References Cited

U.S. PATENT DOCUMENTS

| | | | |
|---|---|---|---|
| 10,089,981 | B1* | 10/2018 | Elangovan ............... G10L 15/22 |
| 11,631,406 | B2* | 4/2023 | Kim ......................... G10L 15/08 704/251 |
| 2007/0034697 | A1 | 2/2007 | Walsh |
| 2012/0232906 | A1* | 9/2012 | Lindahl ................... G10L 15/22 704/270.1 |
| 2012/0278076 | A1 | 11/2012 | Lloyd et al. |
| 2013/0073293 | A1 | 3/2013 | Jang et al. |
| 2016/0098991 | A1* | 4/2016 | Luo ........................ G10L 15/063 455/563 |
| 2017/0092269 | A1* | 3/2017 | Haubrich .............. H04R 25/554 |
| 2018/0261224 | A1* | 9/2018 | Huang ................... H04M 1/271 |
| 2018/0322872 | A1* | 11/2018 | Cha ......................... G10L 15/22 |
| 2019/0260757 | A1* | 8/2019 | Ernesti ................... H04W 12/63 |
| 2019/0287521 | A1* | 9/2019 | Su ............................ G06F 3/167 |
| 2020/0064458 | A1* | 2/2020 | Giusti .................... G01S 13/426 |
| 2020/0105273 | A1* | 4/2020 | O'Donovan ............ G10L 15/30 |
| 2020/0211573 | A1* | 7/2020 | Bechtel ................... G10L 15/22 |
| 2020/0219503 | A1* | 7/2020 | He ......................... H04M 1/271 |
| 2020/0244788 | A1* | 7/2020 | Adams .................. H04M 1/271 |
| 2020/0349943 | A1* | 11/2020 | Elangovan ............. H04M 1/271 |
| 2021/0012775 | A1* | 1/2021 | Kang ...................... G10L 15/083 |
| 2021/0168293 | A1* | 6/2021 | Yang ...................... H04N 23/695 |
| 2021/0304342 | A1* | 9/2021 | Siddoway ............... G06F 3/167 |
| 2021/0304734 | A1* | 9/2021 | Kang ...................... G10L 15/063 |

* cited by examiner

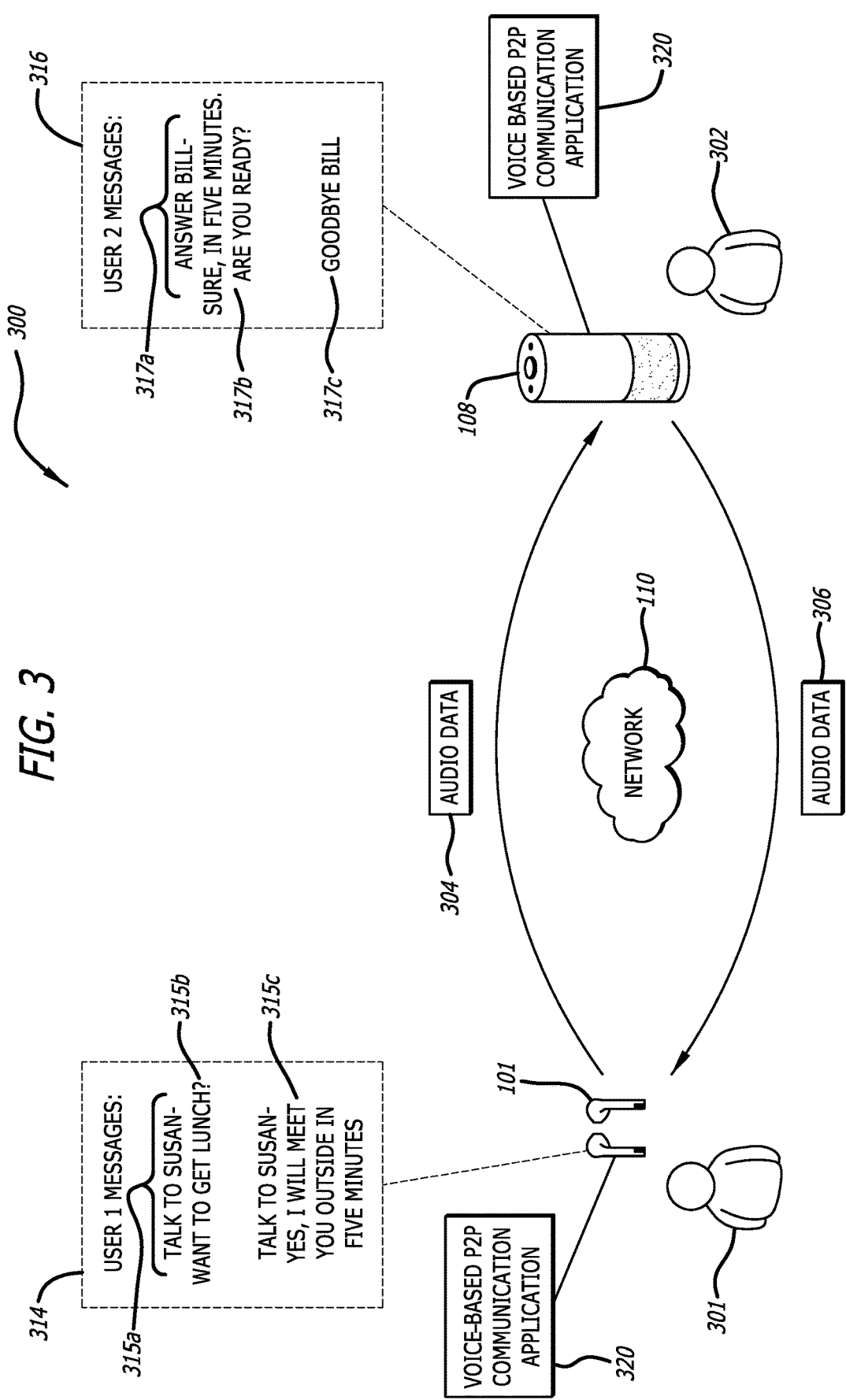

SYSTEMS AND METHODS FOR DETECTING VOICE COMMANDS TO GENERATE A PEER-TO-PEER COMMUNICATION LINK

PRIORITY

This application claims the benefit of and priority to U.S. Provisional Application No. 63/195,909, filed Jun. 2, 2021, and U.S. Provisional Application No. 63/034,815, filed Jun. 4, 2020, both of which are incorporated in their entireties herein.

FIELD

The field of the present disclosure generally relates to communication systems. More particularly, the field of the present disclosure relates to systems and a method for detecting voice commands that are used to generate a peer-to-peer communication link between users.

BACKGROUND

Wireless communication is one of the most rapidly developing areas of communication today. A number of technologies and devices, such as cell phones, pagers, walkie-talkies, and text-enabled devices, are on the market that may enable users to communicate without being tied to wires bound to stationary locations. Among the existing technologies and devices, the cell phones typically require extensive infrastructure and face various network-related issues. That is, for such technologies involving cell phone devices, wireless communications may only be possible within the limited effective areas defined by the infrastructure availability. In addition, infrastructure-based wireless communication services typically require paid subscription to network providers with considerable fees so that the network providers may recover substantial investments made in laying down the extensive infrastructure.

In addition, when a cell phone is used to initiate a call, a user must either operate the phone by hand or awaken the voice agent, such as Siri, Google-Voice, etc., associated with the phone and then issue a command to call a recipient. Furthermore, once the call has been initiated, the recipient must then manually answer the phone while the initiator waits for the recipient to answer the call if the cellular network service is available and strong enough to handle the wireless communication. Meanwhile, other wireless communication devices, such as the walkie-talkies, may be too bulky, require extensive tactile interaction to initiate wireless communications with other users, and rarely be used outside of their specific user communities, such as worksite users or the like. Likewise, most text-enabled devices typically may not provide natural voice communication processes, which substantially hinders the non-textual information contained in voice tone, prosody, etc., and the users' visual attention to their surrounding environments. As such, many of these infrastructure-based wireless communication technologies and devices may be beyond the reach of many users due to geographic and economic constraints and limitations.

BRIEF DESCRIPTION OF THE DRAWINGS

The above, and other, aspects, features, and advantages of several embodiments of the present disclosure will be more apparent from the following description as presented in conjunction with the following several figures of the drawings. The drawings refer to embodiments of the present disclosure in which:

FIG. 3 is a detailed diagram illustration of first and second users communicating with each other through a bi-directional communication link in a voice-based P2P communication system, in accordance with an embodiment of the present disclosure;

DETAILED DESCRIPTION

Figure 1A:
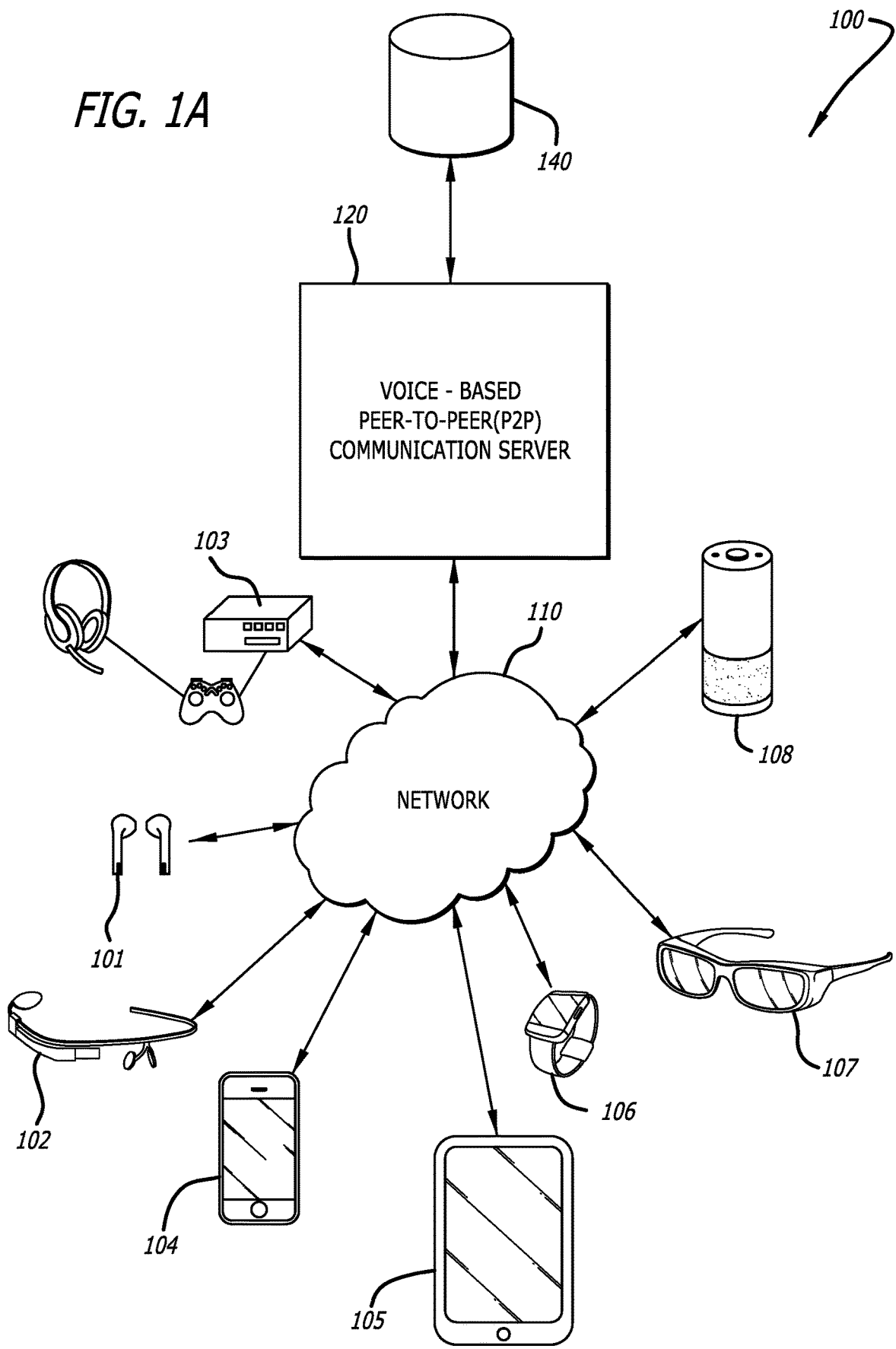
FIG. 1A is an exemplary illustration of a voice-based peer-to-peer (P2P) communication system with a voice-based P2P communication server, in accordance with an embodiment of the present disclosure.

In light of the problems described above, there is a need to facilitate peer-to-peer (P2P) communication with minimal effort by enabling users to effectively communicate with each other directly through continuous audio data transmissions. The embodiments described herein provide and generate these continuous audio data transmission between the users with the P2P communication systems and processes in conjunction the P2P communication computing devices. As described in greater detail below, embodiments may allow the devices such as voice-based earphones to detect one or more voice commands from one or more users, where the detected voice commands may be respectively used to initiate and/or generate a wireless communication link (or voice connection) between the users. In particular, the embodiments may allow a first user to continuously communicate with a second user via the wireless communication link, which may be initiated/generated based on the one or more detected voice commands from the first and second users.

As described in greater detail below, the first voice command detected may include a wake phrase followed by a contact name of the second user (i.e., the recipient's name) and a voice message. The detected wake phrase may include at least a general wake phrase and/or a personalized phrase such as "Hello," "Talk to," and so on. For example, the wireless communication link may be initiated and/or generated in response to the detected voice command ("Talk to Susan—Want to get lunch"), where the detected voice command may include (i) the wake phrase "Talk to" followed by (ii) the recognized contact name "Susan" (i.e., the second user) that matches an entry in a predefined list of contact names associated with the first user and (iii) the voice message "Want to get lunch."

Thereafter, the embodiments may allow the detected voice command data from the first user to be directly transmitted to the respective communication computing device of the second user via the wireless communication link. The second user may then begin to listen to the voice message(s) and directly communicate with the second user over the wireless communication link, once the second user responds back to the received data with a second voice command ("Answer Bill—Sure, in five minutes"). Similar to the first voice command, the detected second voice command may include (i) the answer phrase "Answer" followed by (ii) the recognized contact name "Bill" (i.e., the first user) that matches an entry in a predefined list of contact names associated with the second user and (iii) the voice message "Sure, in five minutes." Finally, the on-going conversation may proceed back-and-forth between the first and second user as continuous bi-directional audio data transmissions via the wireless communication link, until a voice command with a stop phrase such as "Goodbye Bill" is detected—and thus the conversation may be terminated in response to the detected stop phrase.

Before the following embodiments are described in greater detail, it should be understood that any of the embodiments described herein do not limit the scope of the concepts provided herein. It should also be understood that a particular embodiment described herein may have features that may be readily separated from the particular embodiment and optionally combined with or substituted for features of any of several other embodiments described herein.

Regarding the terms used herein, it should be understood that the terms are for the purpose of describing particular embodiments and do not limit the scope of the concepts and/or other embodiments described herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "front," "back," "top," "bottom," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise. For example, in certain situations, the term "logic" may be representative of hardware, firmware and/or software that is configured to perform one or more functions. As hardware, logic may include circuitry having data processing or storage functionality. Examples of such circuitry may include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic.

The term "machine learning" may include any computing circuits that comprise a digital implementation of a neural network. These circuits may include emulation of a plurality of neural structures and/or operations of a biologically based brain and/or nervous system. Some embodiments of machine learning and/or artificial intelligence circuits may comprise probabilistic computing, which may create algorithmic approaches to dealing with uncertainty, ambiguity, and contradiction in received input data. Machine learning circuits may be composed of very-large-scale integration (VLSI) systems containing electronic analog circuits, digital circuits, mixed-mode analog/digital VLSI, and/or software systems.

The term "process" may include an instance of a computer program (e.g., a collection of instructions, also referred to herein as an application). In one embodiment, the process may be included of one or more threads executing concurrently (e.g., each thread may be executing the same or a different instruction concurrently).

The term "processing" may include executing a binary or script, or launching an application in which an object (e.g., a collection of data having a logical structure or organization that enables it to be categorized, typed, etc.) or the like is processed, wherein launching should be interpreted as placing the application in an open state and, in some implementations, performing simulations of actions typical of human interactions with the application.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Referring now to FIG. 1A, an exemplary illustration of a voice-based P2P communication system 100 is shown in accordance with embodiments of the disclosure. In many embodiments, the voice-based P2P communication system 100 may comprise a plurality of personal computing devices 101-108, a voice-based P2P communication server 120, and a data store 140. In some embodiments, the voice-based P2P communication system 100 may utilize the voice-based P2P communication server 120 to be in communication with the personal computing devices 101-108. However, in other embodiments as shown below in FIG. 1B, the voice-based P2P communication system 100 may otherwise be in communication with the personal computing devices 101-108 without the voice-based P2P communication server 120, i.e., each of the personal computing devices 101-108 may operate and communicate with any of the other personal computing devices 101-108 without needing a coordinating communication server, such as the voice-based P2P communication server 120 and/or any other similar communication server. In some embodiments, the personal computing devices 101-108 may be configured—in conjunction with the voice-based P2P communication server 120—to receive (or, monitor, capture, detect, etc.) for audio signal data from one or more users and to generate (or initiate, establish, maintain, etc.) one or more communication links that allow the respective users to communicate with each other based on the received audio signal data.

For example, the voice-based P2P communication system 100 may allow a first user to communicate with a second user via a communication link generated by one or more voice commands (or voice messages), where any of the personal computing devices 101-108 may be utilized by the first and second users to communicate with each other via the communication link. The communication link may be configured as a P2P communication link that enables a continuous bi-directional audio transmission of speech between the first and second users. In most embodiments, the P2P communication link may include any variety of wireless voice connections, including, but not limited to, a wireless link, a Bluetooth link, and/or any other similar audio transmission/communication link. For example, the P2P communication link may involve a direct communication between the personal computing devices 101-108 without the need for intermediaries. In particular, the P2P communication link may be used as a wireless direct communication (i.e., a wireless Bluetooth link) between the personal computing devices 101-108 without the need to pay for signal carriers, spectrum licenses, communication fees, and so on.

As described in further detail below, the first and second users may be any particular type of users that may need to communicate with each other with minimal effort but are separated such that unaided voice communication is not effective. For example, the first and second users may include, but are not limited to, co-workers in a retail store, factory, school, etc., friends or family members at a social event, sporting event, etc., workout friends riding, running, etc., in an outdoor environment, emergency responders at an accident site, and so on. Additionally, in several embodiments, the first and second users may be known users of the voice-based P2P communication system 100, which may provide additional security capabilities between the communication link generated between the first and second users.

The known users may be any particular user derived from a variety of sources that may be particularly identified by any of the personal computing devices 101-108. For example, the voice-based P2P communication system 100 may be configured to particularly identify if one or more words and/or phrases are being said by the known user. The known user may be derived from a variety of identified sources which may be included in a predetermined list of authorized known users associated with any of the particular personal computing devices 101-108 being used. These identified and authorized known users may be associated with vocal characteristics or the like within their speech that are unique to that particular known user. These unique vocal characteristics may be utilized to identify particular words, phrases, etc., spoken by the known user against any other words, phrases, etc., spoken by any unidentified user, where such unidentified users may not be associated with the one or more particular personal computing devices 101-108 and thus not found in the predetermined list of authorized known users.

In many embodiments, the voice-based P2P communication system 100 may utilize the voice-based P2P communication server 120 to configure any of the personal computing devices 101-108 with speech recognition processing capabilities, which thereby allows the personal computing devices 101-108 to continuously monitor for any of the voice commands from any of the users associated with the voice-based P2P communication system 100. As described in greater detail below, the voice commands may include any desired combinations of words and/or phrases spoken by any of the users. In most embodiments, the voice commands may include one or more particular phrases followed by one or more particular contact names (or recipient names, identification names, user names, etc.) of the one or more particular users in addition to one or more particular voice messages (or audio messages, audio/vocal data transmissions, etc.). For example, the particular phrases may include, by way of non-limiting example, one or more wake phrases, answer phrases, stop phrases, and/or any other desired phrases (or word(s)), which may be associated with any other desired predetermined actions capable of being used for any other desired wireless communicative operations.

The voice-based P2P communication system 100 may configure the voice-based P2P communication server 120 in conjunction with the personal computing devices 101-108 to: (i) monitor/receive audio signals, (ii) process audio data from the monitored/received audio signals, (iii) detect voice commands from the processed audio data, and (iv) generate communication links based on the detected voice commands. For example, the voice-based P2P communication system 100 may detect a first voice command that has been processed and received by one of the personal computing devices 101-108 and spoken by the first user associated with that one personal computing device 101-108. In some exemplary embodiments, the first voice command may include a wake phrase such as, by way of non-limiting example, "Hello," "Talk to," etc., followed by a contact name associated with the second user, such as "Susan," "Rachel," etc., and a first voice message such as "Want to get lunch," "What time are you taking a break," etc.

According to those embodiments, the voice-based P2P communication system 100 may detect that the first voice command comprises the following spoken words from the first user: "Talk to Susan—Want to get lunch?" Once the wake phrase "Talk to" has been detected, the voice-based P2P communication system 100 may generate (or initiate) a communication link in response to the detected first voice command if the contact name of the second user "Susan," which follows the wake phrase "Talk to," matches an entry in a predetermined list of contact names (or a predetermined contact list). Once the contact name "Susan" has been matched to one of the entries in the predetermined contact list, the voice-based P2P communication system 100 may then transmit the detected first voice message "Want to get lunch" from that one personal computing device 101-108 of the first user to one of the personal computing devices 101-108 associated with the matched contact name of the second user "Susan" via the generated communication link. Thereafter, the voice-based P2P communication system 100 may alert the second user with the transmitted first voice message "Want to get lunch" in response to similarly receiving, processing, and/or detecting the transmitted voice message on that one personal computing device 101-108 of the second user.

Similar to the speech recognition processes described above with regards to the first user, the voice-based P2P communication system 100 may be configured with similar speech recognition processes with regards to the second user. For example, the voice-based P2P communication system 100 may detect a second voice command that has been processed and received by that one personal computing device 101-108 and spoken by the second user associated with that one personal computing device 101-108. In some exemplary embodiments, the second voice command may include an answer phrase (or a response phrase, a reply phrase, etc.) such as, by way of non-limiting example, "Answer," "Respond back to," etc., followed by a contact name associated with the first user, such as "Bill," "Jonathan," etc., and a second voice message such as "Sure, in five minutes," "I am taking a break in five minutes," etc.

According to those embodiments, the voice-based P2P communication system 100 may detect that the second voice command comprises the following spoken words from the second user: "Answer Bill—Sure, in five minutes." Similar to the processes described above, the voice-based communication system 100 may then transmit the detected second voice message "Sure, in five minutes" from that one personal computing device 101-108 of the second user back to that one personal computing device 101-108 associated with the matched contact name of the first user "Bill" via the generated communication link. In response to this communicative exchange of the wake phrase from the first user and the answer phrase from the second user, voice-based P2P communication system 100 may then allow listening and continuous bi-directional audio transmissions of voice commands between both the first and second users via the communication link until one or more stop phrases are detected and spoken by at least one or more of the first and second users.

For example, the voice-based P2P communication system 100 may detect a third voice command that has been processed and received by that one personal computing device 101-108 and spoken by the second user of that one personal computing device 101-108. In some exemplary embodiments, the third voice command may include a stop phrase such as, by way of non-limiting example, "Goodbye," "Bye," "End," etc., followed by the contact name associated with the first user "Bill" and may further include or not include a third voice message such as "See you soon," etc. According to those embodiments, the voice-based P2P communication system 100 may detect that the third voice command comprises the following spoken words from the second user: "Goodbye Bill." Once the stop phrase "Goodbye" has been detected, the voice-based P2P communication system 100 may proceed to end (or terminate, disconnect, etc.) the communication link that was being used by the first and second users to communicate with each other. It should be noted that the discussion of the voice commands and communication between the first and second users will be depicted in greater detail below (e.g., as shown below with the first and second users 301-302 depicted in FIG. 3).

Continuing with the embodiments depicted in FIG. 1A, the voice-based P2P communication server 120 may be communicatively coupled to one or more network(s) 110 such as, for example, Bluetooth-enabled networks, Personal Area Networks (PANs), and/or the like. While, in other embodiments, the network 110 may be the Internet. The voice-based P2P communication server 120 may be implemented to transmit a variety of data across the network 110 to any number of computing devices such as, but not limited to, the personal computing devices 101-108, one or more servers (e.g., a cloud-based server), and/or any other computing devices. In additional embodiments, any voice-based P2P communication data may be mirrored in additional cloud-based service provider servers, edge network systems, and/or the like. In other additional embodiments, the voice-based P2P communication server 120 may be hosted as one or more virtual servers within a cloud-based service and/or application.

In some embodiments, the transmission of data associated with the voice-based P2P communication system 100 may be implemented over the network 110 through one or more wired and/or wireless connections. For example, one or more of the personal computing devices 101-108 may be coupled wirelessly to the network 110 via a wireless network access point with Bluetooth technology and/or any other similar wireless communicative technologies. As depicted in FIG. 1A, the personal computing devices 101-108 may be any type of computing devices capable of capturing audio data and being used by any of the users, including, but not limited to, a pair of smart hearables 101 such as earbuds, headphones, etc., a head mounted display 102 such as virtual reality head mounted displays, etc., a gaming console 103, a mobile computing device 104, a computing tablet 105, a wearable computing device 106 such as smart watches, voice-based wearables, etc., a smart eyewear device 107 such as voice-based sunglasses, voice-based head/eyewear mounted display, etc., a smart speaker 108 such as voice-based intelligent personal assistants, voice-based speakers, voice-based smart home devices, voice-based security monitor devices, voice-based home appliances, voice-based lighting control devices, etc.

In additional embodiments, the personal computing devices 101-108 may be any type of voice-based computing devices. For example, the voice-based computing devices may include, by way of non-limiting example, any type of portable handheld devices such as a mobile device, a cellular telephone, a mobile or cellular pad, a computing tablet, a personal digital assistant (PDA), any type of wearable devices, any other desired voice-based enabled devices/sensors, and any of one or more widely-used running software and/or mobile operating systems. The voice-based computing devices may be personal computers and/or laptop computers running various operating systems. The voice-based computing devices may be workstation computers running any variety of commercially available operating systems. Alternatively, the voice-based computing devices may be any other electronic device, such as a thin-client computer, a network-enabled gaming system with a messaging input device, and/or a personal voice-enabled messaging device that is capable of communicating over the network 110. Although eight personal computing devices 101-108 are depicted in FIG. 1A, it should be understood that any number of computing devices and any types of computing devices may be utilized by the voice-based P2P communication system 100, without limitation. Also, it should be understood that any types of wired and/or wireless connections (or communication links) between any of the components in the voice-based P2P communication system 100 may be utilized based on any desired combination of devices, connections, and so on, without limitations.

In various embodiments, the voice-based P2P communication system 100 may be implemented to continuously receive and monitor voice-based P2P communication system data from the users via any number of personal computing devices 101-108, personal computers, personal listening computing devices, and/or personal mobile computing devices, where the communication system data may include, but is not limited to, user data, voice data, voice command action data with phrase data, personal information data with key word/phrase data, alert data, privacy data, translation data, captured data with signal and communication data, and/or any other desired voice-based signal data. In many embodiments, the voice-based P2P communication system data may process a plurality of data related to particular voice commands, phrases, contact names, voice messages, alerts, and so on. Furthermore, in some embodiments, the alerts or alert notifications may be generated from a list of predetermined actions within the voice-based P2P communication server 120, the personal computing devices 101-108, and/or any data stores associated with the particular users.

In other embodiments, the voice-based P2P communication system data may initially be stripped of some personal identifying data, which may include personal payment data, private user data such as private communication data, and so on, and may then be transmitted to the voice-based P2P communication server 120, the data store 140, and/or any other cloud-based services for processing and/or storing. The processed and/or stored data may then be transmitted back to the respective personal computing devices 101-108 for output to the users. For example, the stripped, processed, and stored data may be transmitted using one or more forms of data transmission such as blockchain-based data transmission, hash-based data transmission, encryption-based data transmission, and/or any other similar protected data transmission techniques.

Additionally, in some embodiments, the voice-based P2P communication server 120 may be implemented to run one or more voice-based P2P communication services or software applications provided by one or more of the components of the voice-based P2P communication system 100. The voice-based P2P communication services or software applications may include nonvirtual and virtual health monitoring/detecting environments. For some embodiments, these services may be offered as web-based or cloud services or under a Software as a Service (SaaS) model to the users of any of the personal computing devices 101-108. The users of any of the personal computing devices 101-108 may in turn use one or more client/user applications to interact with the voice-based P2P communication server 120 (and/or the data store 140) and utilize the services provided by such servers.

As described above, the voice-based P2P communication server 120 may be configured for speech recognition and voice command detection. That is, the voice-based P2P communication server 120 may, in many embodiments, be configured to receive various audio signals from any of the personal devices 101-108 and then provide audio input signals (or samples) to one or more neural networks located within and/or communicatively coupled with the voice-based P2P communication server 120, where the one or more neural networks may respectively process the provided audio input signals to generate/transmit one or more particularly desired signal output data. The design and utilization of the neural networks in this manner is described in greater detail within co-pending U.S. patent application Ser. No. 16/701,860, filed Dec. 3, 2019, which is assigned to the common assignee, the disclosure of which is incorporated herein by reference in its entirety.

The voice-based P2P communication server 120 may be configured as personalized computers, specialized server computers (including, by way of non-limiting example, personal computer (PC) servers, mid-range servers, mainframe computers, rack-mounted servers, etc.), server farms, server clusters, and/or any other appropriate desired configurations. The voice-based P2P communication server 120 may include one or more virtual machines running virtual operating systems, and/or other computing architectures involving virtualization. One or more flexible pools of logical storage devices may be virtualized to maintain virtual storage devices for the voice-based P2P communication server 120. Virtual networks may be controlled by the voice-based P2P communication server 120 using software-defined (or cloud-based/defined) networking. In various embodiments, the voice-based P2P communication server 120 may be configured to run one or more instructions, programs, services, and/or software applications described herein. For example, the voice-based P2P communication server 120 may be associated with a server implemented to perform any of the processes depicted below in FIGS. 3-6. The voice-based P2P communication server 120 may implement one or more additional server applications and/or mid-tier applications, including, but are not limited to, hypertext transport protocol (HTTP) servers, file transfer protocol (FTP) servers, common gateway interface (CGI) servers, database servers, and/or the like.

As shown in FIG. 1A, the voice-based P2P communication system 100 may also include the data store 140. Although only one data store 140 is shown in FIG. 1A, it should be understood that the voice-based P2P communication system 100 may utilize any number of desired data stores, without limitation. The data store 140 may reside in a variety of locations. By way of non-limiting example, the data store 140 may reside on a non-transitory storage medium local to (and/or resident in) the voice-based P2P communication server 120. Alternatively, the data store 140 may be remote from the voice-based P2P communication server 120 and in communication with the voice-based P2P communication server 120 via any desired connections/configurations. In other embodiments, the data store 140 may be remote and communicatively coupled directly with the network 110 without needing a voice-based P2P communication server as shown below in FIG. 1B. In some embodiments, the data store 140 may be one or more external user-related data stores used to store data related to any particular user data that may be associated with any of the particular users of the voice-based P2P communication system 100, including private communicative information, private contact information, and/or secure payment information, etc. For example, the external data store may be stored remotely from the voice-based P2P communication server 120 and any of the personal computing devices 101-108.

Figure 1B:
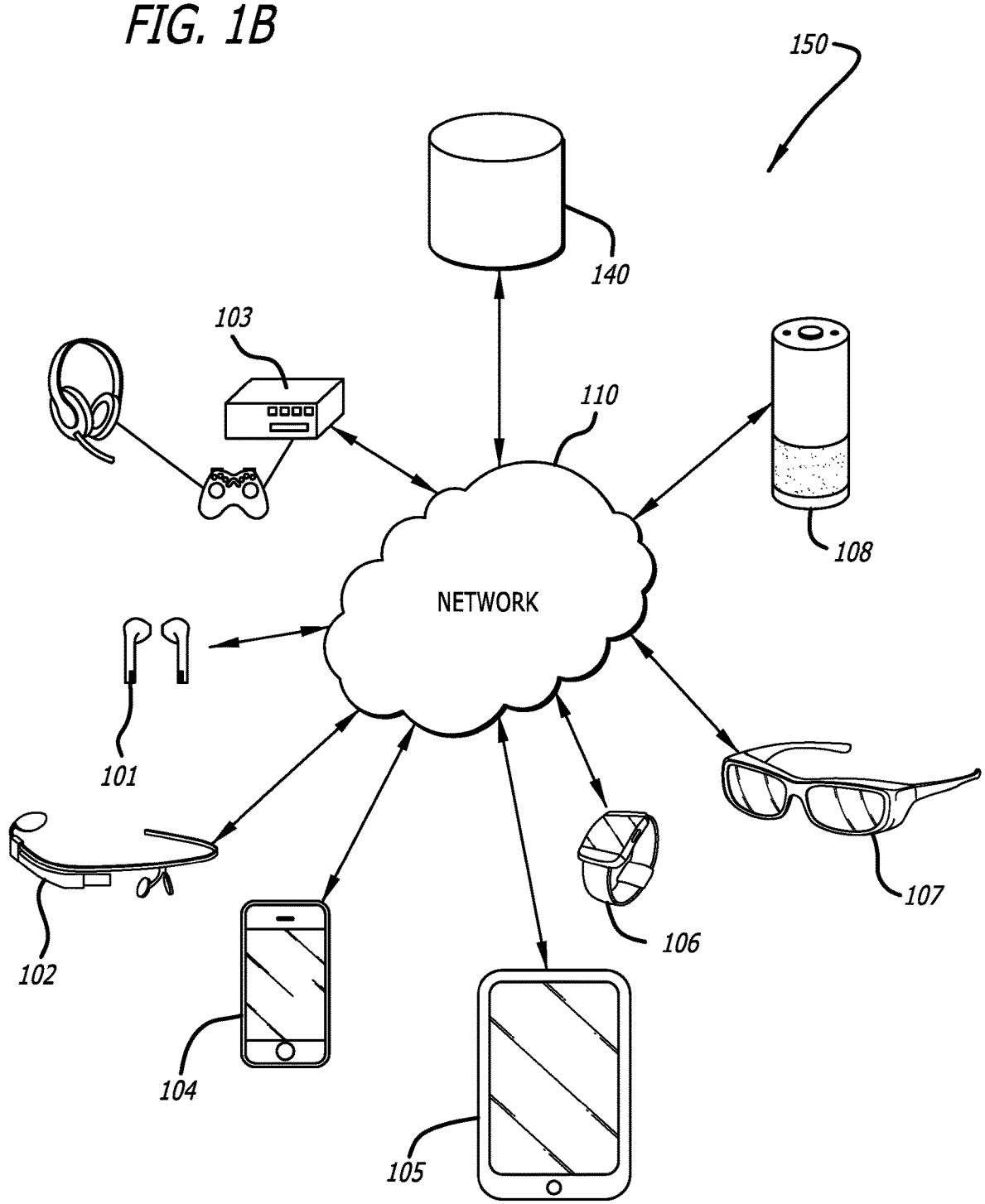
FIG. 1B is an exemplary illustration of a voice-based peer-to-peer (P2P) communication system, in accordance with an embodiment of the present disclosure.

Referring now to FIG. 1B, an exemplary illustration of a voice-based P2P communication system 150 is shown in accordance with embodiments of the disclosure. In many embodiments, the voice-based P2P communication system 150 may comprise a plurality of personal computing devices 101-108 and a data store 140. In some embodiments, the voice-based P2P communication system 150 may be configured to enable any of the personal computing devices 101-108 to directly communicate with each other—without a voice-based P2P communication server and/or the like. For example, as shown in FIG. 1B, each of the personal computing devices 101-108 may operate and communicate with any of the other personal computing devices 101-108 without needing a communication server or the like such as the voice-based P2P communication server 120 depicted in FIG. 1B.

In most embodiments, the voice-based P2P communication system 150 depicted in FIG. 1B may be substantially similar to the voice-based P2P communication system 100 depicted in FIG. 1, with the exception (i) that the voice-based P2P communication system 150 is configured to establish one or more P2P communication links for any of the personal computing devices 101-108, without a voice-based P2P communication server; and (ii) that each personal computing device 101-108 depicted in FIG. 1B is capable of operating and communicating directly with any other personal computing device 101-108 via the respective P2P communication links, without a voice-based P2P communication server. For example, each personal computing device 101-108 may be configured with a voice-based P2P communication computer application (or computer program, service, etc.) that allows such personal computing device 101-108 to communicate via a P2P communication link with another personal computing device 101-108 to thereby enable a continuous bi-directional audio transmission of speech between the users of the respective personal computing devices 101-108. Although only eight personal computing devices 101-108, one network 110, and one data store 140 are depicted in FIG. 1B, it should be understood that any number and type of personal computing devices 101-108, networks 110, and data stores 140 may be implemented by the voice-based P2P communication system 150, without limitations.

Figure 2A:
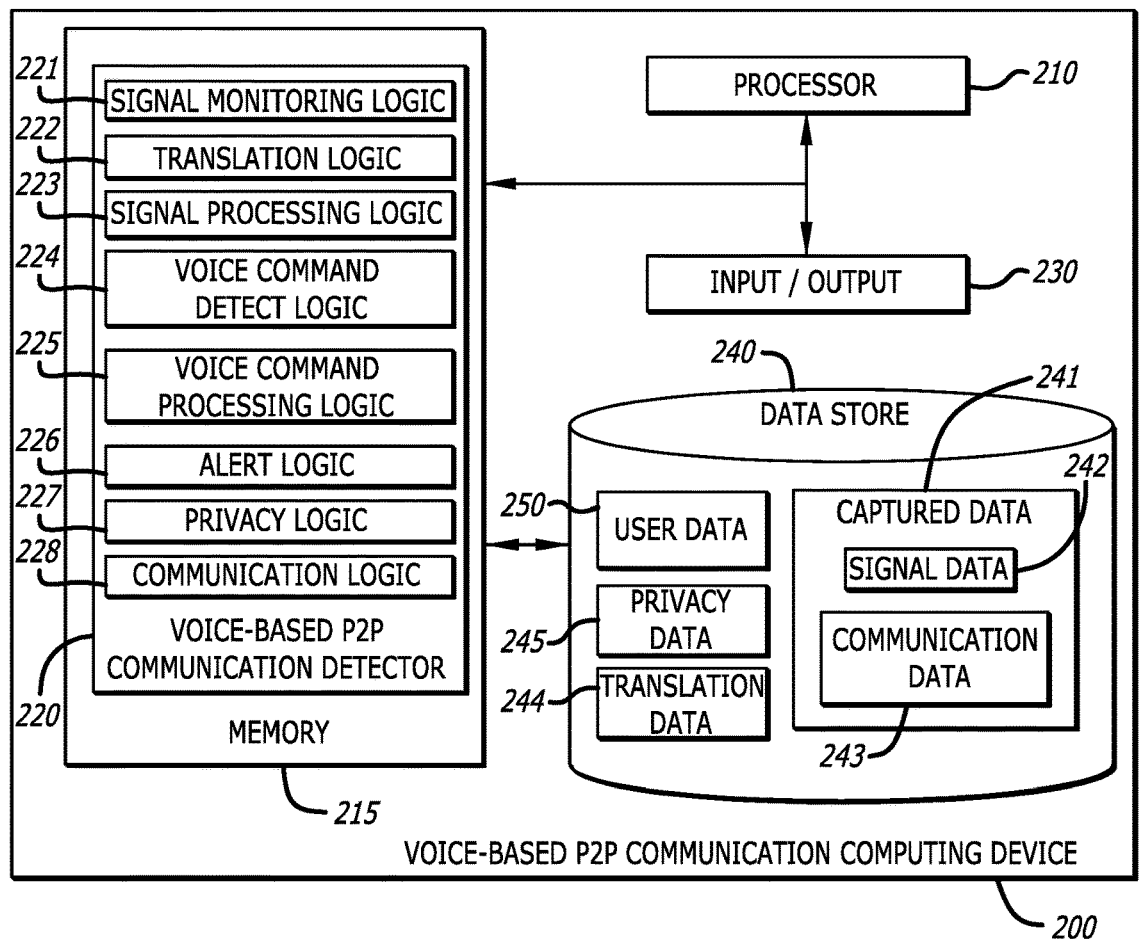
FIG. 2A is an abstract illustration of a voice-based P2P communication device, in accordance with an embodiment of the present disclosure.

Referring now to FIG. 2A, an exemplary illustration of a voice-based P2P communication computing device 200 is shown, in accordance with embodiments of the disclosure. In many embodiments, the voice-based P2P communication computing device 200 may include a processor 210, a memory 215 with a voice-based P2P communication detector/application 220, an input/output 230, and a data store 240. The voice-based P2P communication computing device 200 depicted in FIG. 2A may be substantially similar to the voice-based P2P communication server 120 depicted in FIG. 1A. Alternatively, the voice-based P2P communication computing device 200 depicted in FIG. 2A may be substantially similar to any of the personal computing devices 101-108 of the voice-based P2P communication system 150 depicted in FIG. 1B.

For example, the voice-based P2P communication computing device 200 depicted in FIG. 2A may be implemented, by way of non-limiting example, with the voice-based P2P communication system 100 in FIG. 1A and/or the voice-based P2P communication system 150 in FIG. 1B, as well as with any other similar communicative devices, servers, and/or systems depicted in FIGS. 1A-B, which may include any of the personal computing devices 101-108, the data store 140, and/or any of the other computing devices described herein. In some embodiments, the voice-based P2P communication computing device 200 may be any variety of computing devices that may implement any variety of voice-based P2P communication processes described herein, such as any of the processes depicted above in the voice-based P2P communication systems 100 and 150 of FIGS. 1A-1B and/or any of the processes depicted below in FIGS. 3-6. The various computing devices may include any personal computing devices 101-108 depicted in FIGS. 1A-1B and/or any voice-based computing devices having sufficient speech recognition and voice command detection processing capabilities, which allows such voice-based computing devices to be configured for receiving, processing, generating, and transmitting any audio data produced by any users via any communication links.

In an exemplary embodiment, the voice-based P2P communication computing device 200 may be communicatively coupled to one or more of the personal computing devices 101-108 of FIGS. 1A-1B, which may be configured to monitor and receive audio signal data from the users and thereby detect any particular voice commands spoken by the respective users, once the monitored/received audio signal data has been processed. Such voice commands may be used by the voice-based P2P communication computing device 200 to allow the respective users to communicate with each other via wireless communication links. In many embodiments, the voice-based P2P communication computing device 200 may detect such voice commands and generate such communication links by implementing one or more of the available logics 221-228 associated with the application of the voice-based P2P communication detector 220 in the memory 215.

Figure 2B:
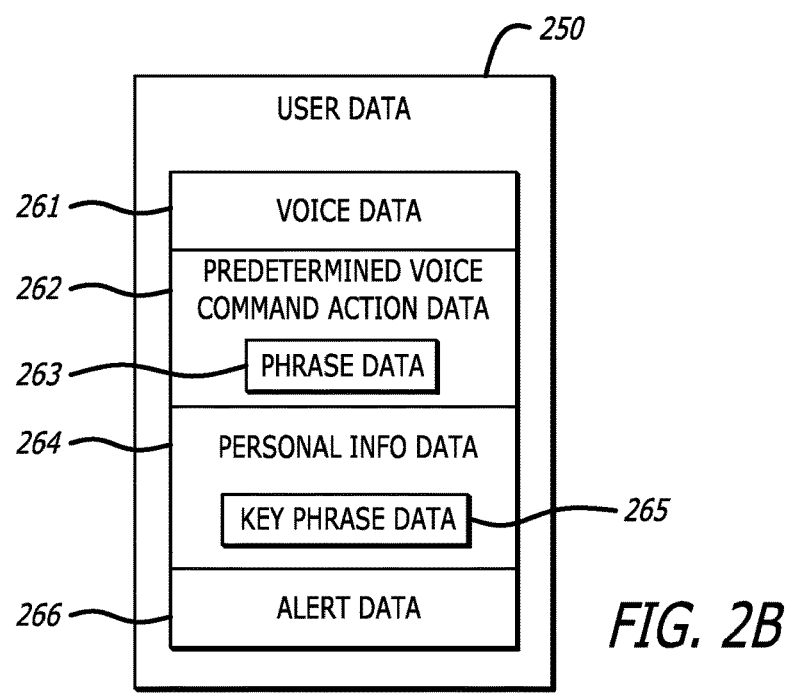
FIG. 2B is an abstract illustration of user data, in accordance with an embodiment of the present disclosure.

As illustrated in FIG. 2A, the memory 215 may comprise the voice-based P2P communication application 220 which may further comprise signal monitoring logic 221, translation logic 222, signal processing logic 223, voice command detect (or detection) logic 224, voice command processing logic 225, alert logic 226, privacy logic 227, and/or communication logic 228. Whereas, as illustrated in FIGS. 2A-2B, the data store 240 may include captured data 241 with signal data 242 and communication data 243, translation data 244, privacy data 245, and user data 250 with voice data 261, predetermined voice command action data 262 with phrase data 263, personal information data 264 with key phrase data 265, and alert data 266. Although eight available logics 221-228 are shown in FIG. 2A, it should be understood that any number of logics may be utilized, that any type and/or any number of different structures of logics may be utilized, and that any one or more of the illustrated logics may be omitted, combined, processed externally, and so on, without limitations.

In a number of embodiments, the signal monitoring logic 221 may be configured to receive and/or facilitate transfer of data between the voice-based P2P communication computing device 200 and any external computing devices, such as the personal computing devices 101-108 of FIGS. 1A-1B, external voice-based devices, and so on. For example, the data received by the signal monitoring logic 221 may be stored as the captured data 241 within the data store 240. Furthermore, the captured data 241 may include any types of captured data from the signal monitoring logic 221, including the signal data 242 and the audio/voice communication data 243 stored within the captured data 241 and capable of being monitored, captured, and received by the signal monitoring logic 221.

In several embodiments, the signal monitoring logic 221 may be configured to operate with the communication logic 228 to establish (or initiate, generate, etc.) one or more communication channels/links with the external computing devices of the one or more users via a network such as the network 110 of FIG. 1A. Such communications links may allow the respective users to communicate with each other through their respective external computing devices which may capture and transmit any audio signal data such as the communication data 243. In most embodiments, the one or more communication link(s) may be implemented as a wireless network voice connection (e.g., a Bluetooth wireless voice connection), which can provide bi-directional audio transmissions relayed (or routed, communicated, etc.) between the external computing devices of the users. Certain embodiments may utilize network connection tools provided by the operating system of the voice-based P2P communication computing device 200.

The signal monitoring logic 221 may be configured to receive any signal inputs from any suitable signal input sources, such as a microphone, an audio data source, a sensor, and/or the like. The microphone may be any type of microphones such as an audio microphone, a digital microphone, and/or any other waveform (or signal pattern) detecting device. The audio data source may be comprised of any other type of processing data sources capable of receiving, detecting, and/or transmitting various input/output signals. The sensor may be comprised of any type of sensors, sensor-enabled devices, and/or sensor processing devices that are capable of receiving, detecting, and/or transmitting various audio signals. In an exemplary embodiment, the sensors may include, by way of non-limiting example, voice-based sensors, voice-based wearable sensors, infrared sensors, pressure sensors, temperature sensors, proximity sensors, motion sensors, fingerprint scanners, photo eye sensors, wireless signal antennae, accelerometers, gyroscopes, magnetometers, tilt sensors, humidity sensors, barometers, light sensors (e.g., ambient light sensors), color sensors, touch sensors, flow sensors, level sensors, ultrasonic sensors, smoke sensors, alcohol sensors, gas sensors, and so on.

For example, the signal input data received by the signal monitoring logic 221 via the microphone, the audio data source, and/or the voice-based sensor may be stored as the signal data 242 and/or the communication data 243 within the captured data 241 of the data store 240, where the signal data 242 may include any type of signal input data such as audio data, audio signal streams, audio waveform samples, etc., and the communication data 243 may further include any type of signal data 242 that may comprise any type of audio/voice data related to one or more voice commands, phrases, words, conversations, and/or any other communication-based data spoken by the users.

In some embodiments, the translation logic 222 may be configured to translate any spoken words of any of the users from any particular language to any other desired language. For example, the translation logic 222 may be configured to operate with the signal monitoring logic 221 to receive a first audio data in a first language such as Spanish and then translate the received first audio data in the form of Spanish words/phrases to a second audio data in a second language such as English and thus in the form of English words/phrases. Moreover, the translation logic 222 may be utilized to translate any inbound and/or outbound audio data transmissions. The translation logic 222 may be configured to translate any desired languages such as any languages associated with the particular users of the voice-based P2P communication computing device 200. According to such embodiments, the translation logic 222 may be configured to translate any languages that may be stored as a language bank having any variety of languages that are stored in the translation data 244 within the data store 240.

In many embodiments, the signal processing logic 223 may be configured to receive, process, and transmit any input data such as the captured data 241 with the signal and communication data 242-243 received by the signal monitoring logic 221. In some embodiments, the signal processing logic 223 may be implemented as a single signal (or sample) processing logic and/or two or more signal processing logics configured to operate with each other. For example, the two signal processing logics may be implemented as a signal pre-processing logic in conjunction with a signal processing logic, which are configured to process the signal input data received by the signal monitoring logic 221.

In some embodiments, the signal processing logic 223 may be configured to utilize the voice commands extracted from the audio input data such as the communication data 243 of the captured data 241 to arrive at one or more actionable decisions by a neural network and/or the like. For example, one or more voice commands may be configured based on the phrase data 263 of the predetermined voice command action data 262 to arrive at the one or more desired actionable decisions. In many embodiments, the signal processing logic 223 may be configured as a filter bank or the like that may be used to receive signal data, for example, the captured signal data 242, where the received data may be filtered, pre-processed, and/or processed based on the desired actionable decisions.

That is, in some embodiments, the signal processing logic 223 may be configured as an enhancement filter or the like that may be configured to suppress undesired noise in a signal by selectively attenuating or boosting certain components of the signal on a time-varying basis, and/or by suppressing undesired noise in a signal by selectively attenuating or boosting certain components of the signal on a time-varying basis. In additional, the signal processing logic 223 may be configured as a pulse-density modulation (PDM) decimation logic configured to decimate PDM audio signals from any of signal input sources described herein to a baseband audio sampling rate for use in the voice-based P2P communication computing device 200. The signal processing logic 223 may be configured to receive any type of signal data such as frequency elements or signal spectrum information in the form of Fourier transforms or similar frequency decompositions, where the received signal data may be processed for audio signal-processing tasks such as audio enhancement, de-noising, and/or the like.

In many embodiments, the voice command detect logic 224 may be configured to operate with the signal processing logic 223 to receive the audio signal-processing tasks, audio input data, and subsequently perform any variety of voice command recognition tasks. For example, the voice command detect logic 224 may be configured to identify a voice command from the received signal data 242 based on the identified voice command, where the identified voice command may include at least one or more of a phrase, a contact name, and/or a voice message, and where the phrase may be a wake phrase, a response phrase, a stop phrase, and so on. Furthermore, the voice command detect logic 224 may be configured to generate at least one or more of the phrase data 263, the user data 250, and/or the communication data 243 based on the identified voice commands (i.e., the one or more identified voice messages from the identified voice command may be configured in the form of communication data).

In addition, the voice command detect logic 224 may have access to one or more data types within the user data 250 depicted in FIG. 2B, which may include one or more lists of predetermined phrases and words stored within phrase data 263, one or more lists of key (or personalized) phrases and words stored within key phrase data 265, and/or particular voice identification data of the particular users (or known users) stored within the voice data 261 and/or personal information data 264. In some embodiments, the voice command detect logic 224 may be utilized in conjunction with the signal processing logic 223 to then transmit the identified voice commands and generated/processed voice commands and phrase data to the voice command processing logic 225 based on the results aggregated from the performed voice command recognition tasks of the signal processing logic 223 and the voice command detect logic 224.

In many embodiments, the voice command processing logic 225 may be configured to identify (or extract) one or more vocal characteristics from the processed signal input data, such as the processed voice commands, phrase data, user data, and so on. For example, the voice command processing logic 225 may be configured to identify the one or more vocal characteristics from the identified voice command from the voice command detect logic 224. That is, the one or more identified vocal characteristics from the identified voice command may include at least one or more of particular phrases, contact names, and/or voice messages. In several embodiments, the voice command processing logic 225 may utilize the identified phrase from the identified voice command and then determine whether the identified phrase is a wake phrase, a response phrase, and/or a stop phrase based on the particular user data 250 associated with that identified phrase. As such, in many of the following embodiments, the voice command processing logic 225 may then be configured to process the identified phrase of the identified voice command against the key phrase data 265 stored within the personal information data 264 of the user data 250 to thereby generate the phrase data 263 and the respective communication data 243. Furthermore, the generated phrase data 263 may processed against the predetermined voice command action data 262 to thereby arrive at one or more predetermined actions such as one or more conversation actions that may be involved between the users.

For example, the voice command processing logic 225 may be configured to process the identified voice command and phrase against the personal information data 264 within the user data 250 to identify a particular key phrase data 265 associated with the voice command and phrase of a particular user (e.g., a personalized wake phrase such as "Hit up," "Contact," etc.). Once the particular key phrase data 265 has been identified, the voice command processing logic 225 may process the identified key phrase data 265 to generate the phrase data 263 within the user data 250 associated with the particular user. Once the particular phrase data 263 has been generated, the voice command processing logic 225 may then process the generated phrase data 263 against the predetermined voice command action data 262 associated with the particular user to thereby arrive at one or more actionable decisions, such as initiate a conversation, respond to a conversation, stop a conversation, and so on.

In many embodiments, the voice command processing logic 225 may also be configured to process the one or more identified contact names against the user data 250 associated with the particular user, such as the personal information data 264 depicted in FIG. 2B stored in the user data 250. For example, if identified phrase is identified as a wake phrase, the voice command processing logic 225 may be configured to determine whether the wake phrase is followed by a particular contact name that may be recognized in a particular contact list associated with the particular user. As described above, the identified contact name may be recognized as a recipient name of the particular contact name of another particular user that may be processed against entries of the particular contact list of the particular user stored within the particular personal information data 264 of the particular user data 250. For example, the identified recipient name may be checked against the one or more entries of the particular contact list of the particular to thereby determine whether the identified recipient name matches any entries in the particular contact list.

As a result, the recipient name may be identified by the voice command processing logic 225 as a recognized name that matches at least one entry in the contact list or an unrecognized name that does not match any of the entries in the contact list. It should be noted that the recognized recipient name may be the name of one of the known users associated with the voice-based P2P communication computing device 200, without limitation. In some embodiments, each of the known users may be associated with their own contact list, which may be different from the contact lists of the other known users. Alternatively, in other embodiments, each of the known users may be associated with a single shared contact list.

In many embodiments, the alert logic 226 may be configured to generate alert data 266 depicted in FIG. 2B that may be stored within the user data 250. For example, in response to identifying that the received voice command includes a voice message transmitted from another user, the alert logic 226 may operate in conjunction with the voice command processing logic 225 to alert the particular user of the received voice message that was transmitted by the other user. In some embodiments, the alert logic 226 may be configured to particularly transmit the generated alert data 266 to one or more predetermined personal computing devices associated with the particular user to particularly receive/listen to the received voice message from the other. In many embodiments, any of the particular alerts generated by the alert logic 226 and/or stored in the alert data 266 of the FIG. 2B may comprise any type of alert notifications used to particular notify and indicate to the particular user that one or more voice messages have been received and transmitted by another user, which may be used to establish a communication link between both users if/when that particular user responds back to the received voice command with a follow-up voice command having a response phrase followed by the contact name of that other user and a response voice message.

In some embodiments, the privacy logic 227 may be configured to receive and transmit any privacy data 245 such as any private data comprising one or more data points from the personal information data 264. The privacy logic 227 may be used for transmitting any privacy data 245 related to any particular user personal information that is private and associated with any of the particular users. The privacy logic 227 may be configured to strip any particular privacy data 245 that may not be transmitted and/or may be configured to transmit any privacy data 245 such as any private information from the personal information data 264 via blockchain-based data transmission, hash-based data transmission, encryption-based data transmission, and/or any other similar protected data transmission.

In many embodiments, the communication logic 228 may be configured to generate communication links to facilitate the audio transmission (e.g., continuous bi-directional audio transmission) of the communication data 243 from the voice-based P2P communication computing device 200 of the particular user to another P2P communication computing device of another user. For example, once the identified voice command has been processed for the identified wake phrase and the identified contact name, the communication logic 228 may be configured to initiate the conversation with the identified contact name of the other user by transmitting the identified voice message from the identified voice command to the other P2P communication computing device of the other user via the generated communication link. The communication logic 228 may be configured to process and/or format the communication data 243 into a form of audio transmission data which may be transmitted as acceptable/suitable audio input data for the other P2P communication computing devices. As those skilled in the art will understand, the communication logic 228 may be configured to format or otherwise process communication data 243 to any desired suitable audio transmission data that may be processed by other P2P communication computing devices, without limitation.

Referring now to FIG. 2B, an abstract illustration of a user data 250 is shown, in accordance with embodiments of the disclosure. As described above with reference to FIG. 2A, the user data 250 may exist within the data store 240 and may be unique to each user (or known user) that is associated with the voice-based P2P communication computing device 200. The user data 250 in FIGS. 2A-2B is depicted as being portioned and stored based on the individual data types associated with the particular user. Further discussion of the types of data that may be found within the user data 250 is depicted below. The user data 250 may comprise voice data 261, predetermined voice command action data 262 with phrase data 263, personal information data 264 with key phrase data 265, and alert data 266. Although four data types 261-262, 264, 266 are shown in FIG. 2B, it should be understood that any number of data types may be utilized and any one or more of the illustrated data types may be omitted, combined, and so on, without limitations. Additionally, it should be understood that the user data 250 may be utilized for all the known users and/or may also be utilized to store any of the desired data types associated with only one known user, where each of the known users may have their own respective user data 250 with any number of data types and any types of data store within each of the user data 250, without limitation.

In many embodiments, the voice data 261 may comprise any voice data that is associated with each particularly known user, which may include differentiating particular vocal characteristics of each known user. For example, the voice data 261 may include voice data of one user that has a speech impairment, while the second user has no issues and the voice data associated with that second user is different than that one user. The voice data 261 may be comprised as raw audio data that is captured with a microphone or other audio recording device during the voice-based P2P communication process. This voice data 261 may comprise waveform data and can be formatted into any audio format desired based on the application and/or computing resources. For example, limited storage resources may lead to using increased compression algorithms to reduce size, while computing resources may limit the amount of compression that can be done on the fly. The voice data 261 may be stored in lossy or lossless formats. In some embodiments, the voice data 261 may be processed before storage or utilization elsewhere within the voice-based P2P communication system. Pre-processing can include noise-reduction, frequency equalizing, normalizing, and or compression. Such pre-processing may increase the amount of supplemental data that can be generated from the voice data 261.

In additional embodiments, the predetermined voice command action data 262 may be comprised of one or more actions that are triggered based on the identified key phrase data 265 and/or the generated phrase data 263 from any identified and processed voice commands. For example, the alert logic 226 of FIG. 2A may be configured to trigger, in response to the generated alert data 266, one or more predetermined actions within the predetermined voice command action data 262 such as a predetermined response phrase and so on. The triggered actions may be based on the particular known users associated with their respective key phrase data 265 (and/or the phrase data 263), where each of the known users may have the same and/or different predetermined voice command action data based on the preferences of each of the known users. For example, a first known user may have data stored in the personal information data 264 and the predetermined voice command action data 262 that allows the voice-based P2P communication computing device 200 to process any predetermined (or default) phrases (e.g., "Talk to") and any personalized phrases (e.g., "Hit up," "Contact," etc.) based on the key phrase data 265 associated with the first user; while a second known user may have data stored that allows the voice-based P2P communication computing device 200 to only process personalized phrases based on the key phrase data 265 associated with the second user. As such, once the particular key phrase data 265 for a particular user is processed, the particular phrase data 263 of the particular user may be generated based on that particular processed key phrase data 265, which may thus be configured to trigger the respective actions within the predetermined voice command action data 262 that may be different and/or the same for the users of the voice-based P2P communication computing device 200.

As described above, in several embodiments, the personal information data 264 may include any desired type of personal information related to the users of the voice-based P2P communication computing device 200, which may include the key phrase data 265 and/or any other voice command-based data that may personalized for each of the users. The personal information data 264 may comprise any supplemental personal data that may be generated and associated with each of the known users. In some embodiments, the personal information data 264 may comprise relevant personal account, payment information, and contact data, such as, but not limited to, names, addresses, telephone numbers, age, payment card information, external factor metadata, associated personal computing devices, etc. For example, some or all personal account data may be any data associated with the known user that may be utilized to gain insight into the captured voice data 261, predetermined voice command action data 262, alert data 266, user data 250, and/or any captured data 241 within the data store 240 of FIG. 2A. For example, user data may indicate that a user has an accent (or speaks a particular language) and may then be utilized to further gain understanding (or at least generate an additional data point) when processing their voice data 261 and other subsequent data. The external factor metadata may include any additional data relating to the event and physical location where the data was captured. Some external factor metadata examples may be captured including the global positioning system (GPS) coordinates of where the particular user lives, where the particular signal data 242 was captured (e.g., during an outdoor activity in which the users may be communicating with each other during their running and/or biking activity), what was the quality of the recording, how long the recording was, and so on. For example, some of the external factor metadata may be used, such as the determination that the communication is taking place in an outdoor environment, to establish the communication link and respective audio transmissions based on that particular environment.

Additionally, as described above, the key phrase data 265 stored within the personal information data 264 may be personalized for each of the known users. For example, the key phrase data 265 may include any data related to words, phrases, conversations, and/or the like that are associated with a particularly known user. For example, the voice-based P2P communication computing device 200 of FIG. 2A may be configured as a key phrase and/word spotter. That is, the vocal characteristics extracted from the decimated audio signals may be signals in a time domain, a frequency domain, or both the time and frequency domains that may have one or more characteristics associated with the particular key phrases and/or words and that may be trained to be recognized by one or more neural networks of the voice-based P2P communication computing device 200. The key phrase data 265 may include any data related to any user-specified key phrases and words that may be identified from any type of signals that the particular user wants to detect. For example, the user-specified key phrase data may be any spoken key phrases, words, acoustic signals, etc., that may be personalized and have specific vocal characteristics, sounds, signals, etc., that are particular to that user. In such example, the particular user may have generated and stored the user-specified key phrase data in the particular key phrase data 265, such that the voice-based P2P communication computing device 200 may recognize the personalized words, phrases, and so on such as "Hit up," "Contact," "Let's call," "Reply back," "Terminate," etc., in addition to any other predetermined (or standard, default, etc.) key phrases and/or words that are already included and stored in the data store 240.

In many embodiments, as described above, the alert data 266 may comprise any data associated with one or more generated and transmitted alerts for each of the known users. For example, the alert data 266 may include any wireless voice messages alerts (or notifications) that were generated and transmitted to the respective user of the voice-based P2P communication computing device 200 in response to determining that the initial received voice command includes one or more voice messages received and transmitted from other users. The user alerts may be personalized based on the particular voice commands received by the voice-based P2P communication computing device 200. For example, the alert data 266 associated with a first user may be personalized to only generate and transmit an alert of a received voice message from a user in a personalized contact list, while the alert data 266 associated with a second user may be personalized to generate and transmit any alert of any received voice message as long as the recognized contact name of that user is not in a personalized "excluded" contact list (i.e., a contact list of excluded users that the second user wants to ignore and thus not receive any alerts related to any voice messages from those excluded users).

It will be understood by those skilled in the art that the user data 250 depicted herein with respect to FIGS. 2A-2B is only a single representation of potential user data. For example, various embodiments may have user data 250 pooled together such that all voice data 261 is stored together, all predetermined voice command action data 262 for all users is stored together, etc. Furthermore, other methods of storing user data 250 may be utilized without limitation, such that the user data 250 may be stored externally, while other aspects are stored locally. For example, the user data 250 may store the voice data 261 externally, while the other data types 262-266 may be stored locally for security purposes and/or the like.

Referring now to FIG. 3, a detailed diagram illustration of first and second users 301-302 communicating with each other via a communication link within a voice-based P2P communication system 300 is shown, in accordance with embodiments of the disclosure. The voice-based P2P communication system 300 depicts an exemplary system for speech recognition and voice command detection using one or more voice-based P2P communication applications 320. The voice-based P2P communication system 300 depicted in FIG. 3 may be substantially similar to the voice-based P2P communication systems 100 and 150 depicted in FIGS. 1A-1B. Furthermore, in some embodiments, the voice-based P2P communication application(s) 320 depicted in FIG. 3 may be similar to the voice-based P2P communication server 120 depicted in FIG. 1A.

The voice-based P2P communication system 300 may comprise the users 301-302, the network 110, and the personal computing devices 101 and 108 having one or more voice-based P2P communication applications 320. In most embodiments, the network 110 and the personal computing devices 101 and 108 with the voice-based P2P communication applications 320 depicted in FIG. 3 may be configured substantially similar as the network 110 and any of the personal computing devices 101-108 depicted in FIG. 1B. Similarly, in many embodiments, the personal computing devices 101 and 108 depicted in FIG. 3 may be substantially similar to the voice-based P2P communication computing device 200 depicted in FIG. 2A. For example, similar to the voice-based P2P communication computing device 200 shown in FIG. 2A, each of the personal computing devices 101 and 108 may comprise, but is not limited to, a processor, a memory with a voice-based P2P communication detector/application, an input/output, a data store, and/or any other related voice-based P2P component.

In particular, the personal computing devices 101 and 108 may be implemented as voice-based computing devices having sufficient speech recognition and voice command detection processing capabilities, which allow such personal computing devices 101 and 108 to receive, process, generate, and transmit the audio data 304, 306 produced by the respective users 301-302 via their respective P2P communication links. It should be understood that the personal computing devices 101 and 108 may be any variety of computing devices that may implement any variety of voice-based P2P communication processes described herein, such as any of the processes depicted above in the voice-based P2P communication systems 100 and 150 of FIGS. 1A-1B and/or any of the processes depicted below in FIGS. 3-6, without limitations. Furthermore, in many exemplary embodiments, each of the personal computing devices 101 and 108 may include the one or more voice-based P2P communication applications 320, such that the personal computing devices 101 and 108 are configured to monitor and receive audio data 304, 306 from the users 301-302 and thereby detect any particular voice commands spoken by the respective users 301-602, once the monitored/received audio data 304, 306 has been processed. Such user speech (or user voice commands) may be used by the personal computing devices 101 and 108 in conjunction with the voice-based P2P communication applications 320 to allow the respective users 301-302 to thereby communicate with each other over P2P wireless communication links. For example, as described above, the personal computing devices 101 and 108 may detect such voice commands and generate such communication links by capturing the speech of the users 301-302 with the input/output and thereby implementing the processor and the one or more available logics in the memory associated the voice-based P2P communication applications 320.

Referring back to FIG. 3, the user 301 may be a first user and the user 302 may be a second user that are both associated users with the voice-based P2P communication application(s) 320. The users 301-302 may be comprised of any group of two or more individuals who wish to effectively communicate with minimal effort but are separated from each other, including, but not limited to, two or more co-workers in a retail store, a factory, or the like, two or more friends or family members at a social event, a sports event, or the like, two or more emergency responders at an accident site or the like, two or more friends in an outdoor activity such as running, biking, or the like, and/or any other types of individuals. As shown in FIG. 3, the user 301 may be utilizing the personal device 101 (i.e., the earphones) to receive and transmit audio data 304, 306, while the user 302 may be utilizing the personal computing device 108 (i.e., the smart speaker) to receive and transmit audio data 304, 306, where both the personal computing devices 101 and 108 may be configured with the one or more voice-based P2P communication applications 320, as described above. It should be noted that the depicted personal computing devices 101, 108 may be any type of computing devices described herein that may be utilized by the voice-based P2P communication system 300, without limitation. Also, it should be understood that the one or more voice-based P2P communication applications 320 may be the same application, and/or the one or more voice-based P2P communication applications 320 may be different applications based on the respective user, the respective personal computing device, and so on, without limitations.

In many embodiments, the voice-based P2P communication system 300 may implement the voice-based P2P communication application 320 in conjunction with the personal computing device 101 to receive one or more voice commands 314 (or first user's messages) captured by the personal computing device 101. For example, the personal device 101 may capture an initial voice command from the voice commands 314 which includes a combined wake phrase and contact name 315a ("Talk to Susan") and is followed by a voice message 315b ("Want to get lunch?"). In some embodiments, the one or more voice-based P2P communication application 320 may be configured to process the identified wake phrase, contact name, and voice message 315a-b against the user data associated with the user 301. For example, the identified contact name 315a may be processed to determine whether "Susan" matches an entry in a contact list within the user data associated with the user 301. Thereafter, once the identified wake phrase, contact name, and voice message 315a-b have been processed, the received/processed initial wake phrase, contact name, and voice message 315a-b from the voice commands 314 may be used to generate the audio data 304, where the generated audio data 304 may be respectively transmitted to the user 302 based on the recognized contact name "Susan" which matched the contact name of the user 302.

Similarly, the voice-based P2P communication system 300 may implement the voice-based P2P communication application 320 to receive one or more voice commands 316 (or second user's messages) from the generated/transmitted audio data 304 captured by the personal computing device 108. As described above, the user 302 may then be alerted of the received audio data 304 from the user 301 to thereby detect whether the user 302 desires to respond back to received audio data 304 and establish a communication link with the user 301. For example, the personal computing device 108 may alert the user 302 of the voice message 315b and then capture an initial voice command from the voice commands 316, which includes a combined response phrase and contact name 317a ("Answer Bill") and is followed by voice messages 317b ("Sure, in five minutes. Are you ready?")

Similar to the processes described above, the one or more voice-based P2P communication application 320 may then be configured to process the identified response phrase, contact name, and voice message 317a-b against the user data associated with the user 302. For example, the identified response phrase and contact name 317a may be processed to determine that the particular phrase "Answer Bill" corresponds with the action that the user 302 may respond back to the received voice message 315b and that a communication link with the user 301 may be generated (or initiated, established, maintained, etc.). Once the identified response phrase, contact name, and voice message 317a-b have been processed, the received/processed response phrase, contact name, and voice message 317a-b from the voice commands 316 may be used to generate the audio data 306, where the generated audio data 306 may be respectively transmitted back to the user 301 via the communication link generated between the users 301-302 for continuous bi-directional audio data 304, 306 transmissions over the network 110 (e.g., a wireless Bluetooth network).

As shown in FIG. 3, the personal device 101 may receive the generated audio data 306 via the illustrated communication link between the users 301-302, where the user 301 may respond back to the received voice message 317b from the generated audio data 306 with the voice command 315c ("Talk to Susan—Yes, I will meet you outside in five minutes."). Similar to the processes described above, once the voice command 315c is processed, the audio data 304 may be generated based on the processed voice command 315c and transmitted to the personal computing device 108 via the communication link. Likewise, the personal computing device 108 may receive the generated audio data 304 via the communication link and may then respond back to the received voice message 315b from the generated audio data 304 with the voice command 317c ("Goodbye Bill"). For example, in response to the phrase "Goodbye" being identified and processed from the identified voice command 317c, the voice-based P2P communication application 320 may be configured in conjunction with the personal computing device 108 to process the received/identified voice command 317c to generate the audio data 306 and respectively transmit the generated audio data 306 back to the user 301, where the respective voice-based P2P communication application 320 may thereby end the communication link with the user 301 after the user 301 has been alerted of the received voice message 317b. Although one configuration is shown in FIG. 3 with one communication link, one server, two users, and two personal devices, it should be understood that any variety of configurations, any number of components, and/or any variety of voice commands, phrases, contact names, and voice messages may be utilized by the voice-based P2P communication system 300, without limitations.

Figure 4:
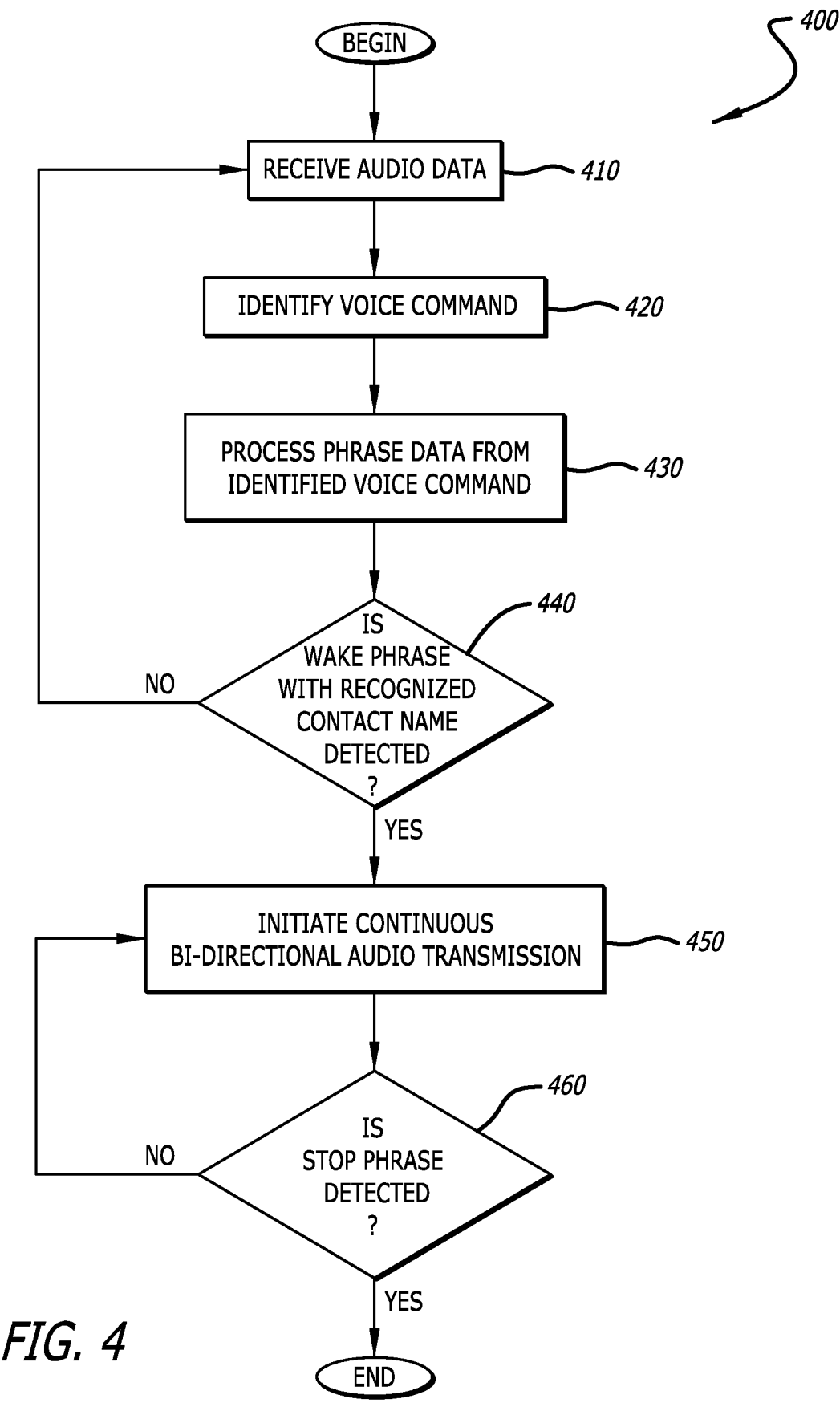
FIG. 4 is a flowchart of a voice-based P2P communication process for a first user, in accordance with an embodiment of the present disclosure.

Referring now to FIG. 4, a voice-based P2P communication process 400 for a first user is shown, in accordance with embodiments of the disclosure. The process 400 in FIG. 4 depicts embodiments of one or more process flows described herein. The process 400 may be depicted as a flowchart that may be used to identify and process voice commands from the first user and may respectively generate a communication link with a second user based on the identified and processed voice commands of the first user. The process 400 may be implemented with one or more personal computing devices and/or systems which may include, but are not limited to, the voice-based P2P communication system 100 depicted in FIG. 1A, the voice-based P2P communication system 150 depicted in FIG. 1B, the voice-based P2P communication computing device 200 depicted in FIG. 2A, the voice-based P2P communication system 300 depicted in FIG. 3, the voice-based P2P communication server 120 depicted in FIG. 1A, and/or the voice-based P2P communication application(s) 320 depicted in FIG. 3. Additionally, as described above in various embodiments, the process 400 may be implemented by way of one or more web-based applications and/or any other suitable software applications. In some embodiments, the application(s) may be implemented as a cloud-based application and/or distributed as a stand-alone software application, as desired, without limitations.

At block 410, the process 400 may begin and may then receive an audio signal data. For example, the process 400 may receive the audio signal data captured by a personal computing device associated with the first user, where the personal computing device may be any type of personal devices similar to the personal computing devices 101-108 depicted in FIGS. 1A-1B. At block 420, the process 400 may identify a voice command from the received audio signal data. For example, the process 400 may identify the voice command from the received audio signal data, which may further identify a phrase, a contact name, and/or a voice message associated with the identified first voice command. At block 430, the process 400 may process a phrase data from identified voice command. For example, once the phrase, contact name, and/or voice message have been identified, the process 400 may then process the identified data such as the phrase data, user data, and/or voice message data. At block 440, the process 400 may determine whether a wake phrase with a recognized contact name has been detected from the processed data.

For example, the process 400 may process the identified data from the voice command to detect the wake phrase and recognized contact name of the second user ("Talk to Susan") and then proceed to block 450. However, in response to determining that the wake phrase and/or contact name was not detected (e.g., the contact name "Susan" may not have been recognized and matched an entry in the first user's contact list), the process 400 may proceed (or loop) back to block 410 to continue monitoring/receiving audio signal data. At block 450, the process 400 may initiate (or maintain) a continuous bi-directional audio data transmission via a communication link generated between the first user and the second user. For example, the process 400 may initiate the communication link with the second user in response to the wake phrase and recognized contact name having been processed. As such, the process 400 may generate audio data based on the processed voice command with the voice message from the first user and then transmit the generated audio data to a personal computing device associated with the second user via the initiated/generated communication link. At block 460, the process 400 may determine whether a stop phrase has been detected from a voice command received/transmitted via the communication link. For example, in response to determining that no stop phrase has been detected, the process 400 may proceed back to block 450 to maintain the continuous bi-directional audio data transmissions between the first and second users. However, as described above, the process 400 may receive a response voice command "Goodbye Bill" relayed by the second user, where the response voice command has been processed to detect the stop phrase: "Goodbye." As such, the process 400 may respectively stop the communication link between the first and second users which may thereby end any further audio data transmissions between the first and second users.

Figure 5:
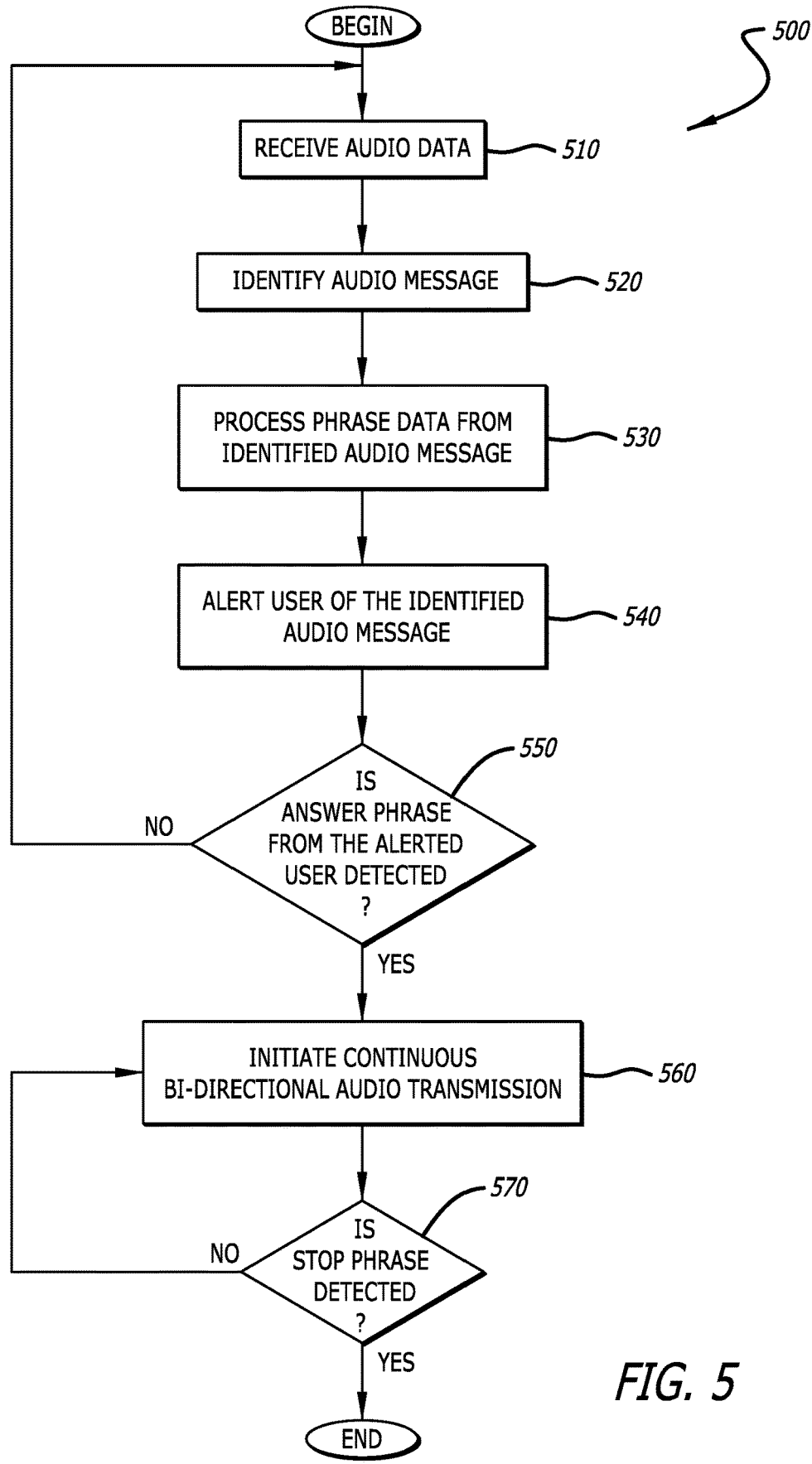
FIG. 5 is a flowchart of a voice-based P2P communication process for a second user, in accordance with an embodiment of the present disclosure.

Referring now to FIG. 5, a voice-based P2P communication process 500 for a second user is shown, in accordance with embodiments of the disclosure. The process 500 in FIG. 5 depicts embodiments of one or more process flows described herein. The process 500 may be depicted as a flowchart that may be used to identify and process voice commands from the second user and may respectively generate a communication link with a first user based on the identified and processed voice commands of the second user. Furthermore, the process 500 may be similar to the process 400 depicted in FIG. 4. The process 500 may be implemented with one or more personal computing devices and/or systems which may include, but are not limited to, the voice-based P2P communication system 100 depicted in FIG. 1A, the voice-based P2P communication system 150 depicted in FIG. 1B, the voice-based P2P communication computing device 200 depicted in FIG. 2A, the voice-based P2P communication system 300 depicted in FIG. 3, the voice-based P2P communication server 120 depicted in FIG. 1A, and/or the voice-based P2P communication application(s) 320 depicted in FIG. 3. Additionally, as described above in various embodiments, the process 500 may be implemented by way of one or more web-based applications and/or any other suitable software applications. In some embodiments, the application(s) may be implemented as a cloud-based application and/or distributed as a stand-alone software application, as desired, without limitations.

At block 510, the process 500 may begin and may then receive an audio signal data. For example, the process 500 may receive the audio signal data captured by a personal computing device associated with the first user, where the personal computing device may be any type of personal devices similar to the personal computing devices 101-108 depicted in FIGS. 1A-1B. At block 520, the process 500 may identify a wireless audio message (i.e., a wireless voice command) based on the received audio signal data. For example, the process 500 may identify the voice command from the received audio signal data from the first user, which may further identify a phrase, a contact name, and/or a voice message associated with the identified first voice command. At block 530, the process 500 may process a phrase data from identified voice command. For example, once the phrase, contact name, and/or voice message have been identified, the process 500 may then process the identified data such as the phrase data, user data, and/or voice message data, where the process 500 may then utilize the processed data to thereby alert the second user of the identified voice command from the received audio signal data transmitted by the first user at block 540.

At block 550, the process 500 may determine whether an answer phrase (or a response phrase, a reply phrase, etc.) has been detected and/or received from the alerted second user. For example, the process 500 may process an audio data received from a voice command detected from the answer phrase spoken by the second user ("Answer Bill—Sure, in five minutes") and may then proceed to block 560. However, in response to determining that the answer phrase was not detected, the process 500 may proceed (or loop) back to block 510 to continue monitoring/receiving audio signal data. At block 560, the process 500 may initiate (or maintain) a continuous bi-directional audio data transmission via a communication link generated between the second user and the first user. For example, the process 500 may initiate the communication link with the first user in response to the answer phrase ("Answer") and contact name ("Bill") having been processed and recognized as the contact name associated with the first user. As such, the process 500 may generate audio data based on the processed voice command with the voice message from the second user and then transmit the generated audio data to a personal computing device associated with the first user via the initiated/generated communication link. At block 570, the process 500 may determine whether a stop phrase has been detected from a voice command received/transmitted via the communication link. For example, in response to determining that no stop phrase has been detected, the process 500 may proceed back to block 560 to maintain the continuous bi-directional audio data transmissions between the second and first users. However, as described above, the process 500 may receive a voice command "Goodbye Bill" spoken by the second user, where such voice command has been processed to detect the stop phrase: "Goodbye." Accordingly, the process 500 may respectively end the communication link and any further audio data transmissions between the second user and the first user.

Figure 6:
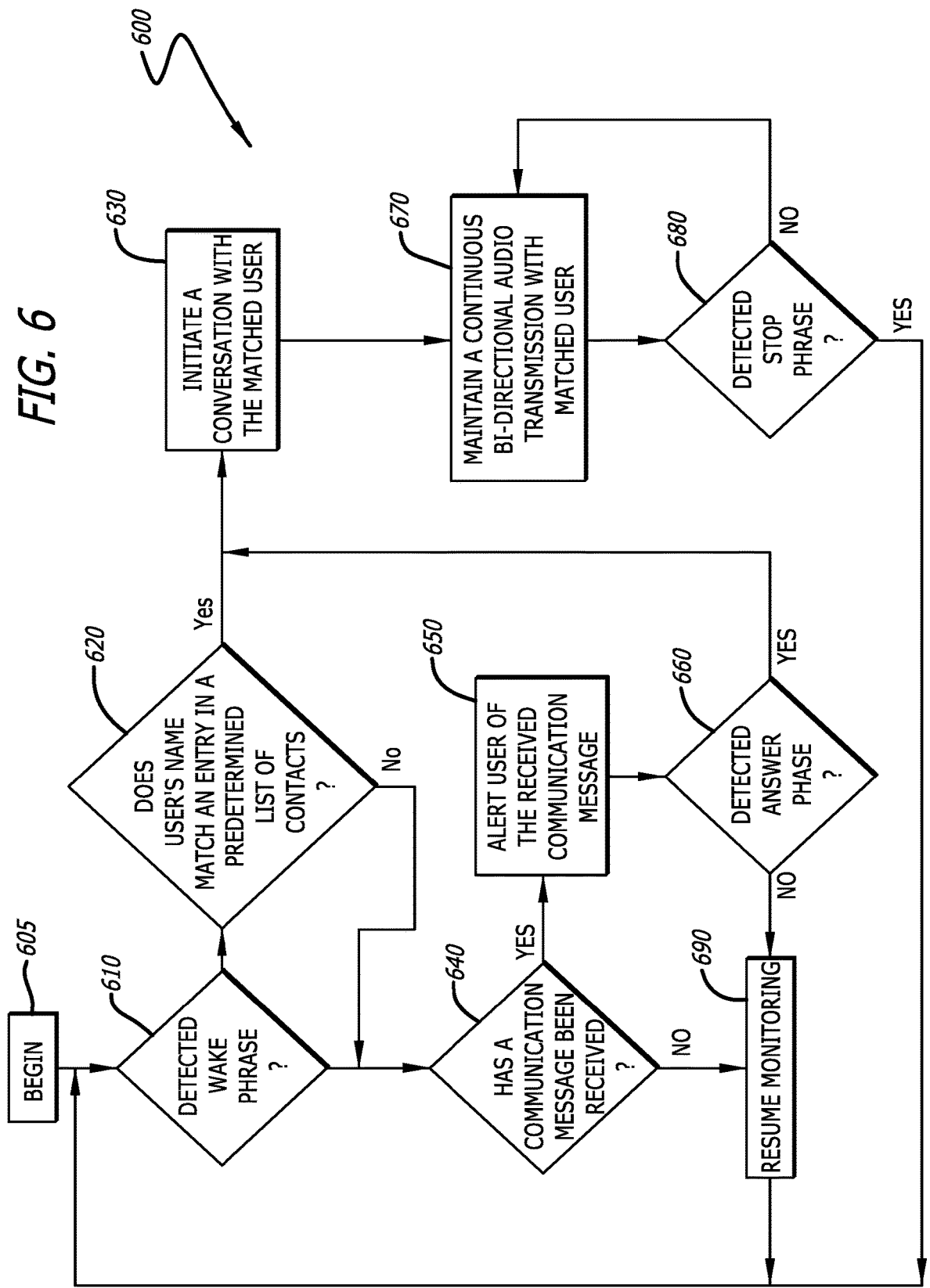
FIG. 6 is a flowchart of a process for detecting voice commands used to establish a bi-directional communication link between users in a voice-based P2P communication system, in accordance with an embodiment of the present disclosure.

Referring now to FIG. 6, a process 600 for detecting voice commands used to establish a bi-directional communication link between users in a voice-based P2P communication system is shown, in accordance with embodiments of the disclosure. The process 600 in FIG. 6 depicts embodiments of one or more process flows described herein. The process 600 may be depicted as a flowchart used to detect voice commands from users and generate communication links between the respective users based on the detected voice commands. Furthermore, the process 600 may be similar to the processes 400 and 500 depicted in FIGS. 4-5. The process 600 may be implemented with one or more personal computing devices and/or systems which may include, but are not limited to, the voice-based P2P communication system 100 depicted in FIG. 1A, the voice-based P2P communication system 150 depicted in FIG. 1B, the voice-based P2P communication computing device 200 depicted in FIG. 2A, the voice-based P2P communication system 300 depicted in FIG. 3, the voice-based P2P communication server 120 depicted in FIG. 1A, and/or the voice-based P2P communication application(s) 320 depicted in FIG. 3. Additionally, as described above in various embodiments, the process 600 may be implemented by way of one or more web-based applications and/or any other suitable software applications. In some embodiments, the application(s) may be implemented as a cloud-based application and/or distributed as a stand-alone software application, as desired, without limitations.

At block 605, the process 600 may begin and enters a listening mode to monitor for one or more voice commands. For example, the process 600 may be configured to operate with one or more P2P communication computing devices similar to the personal computing devices 101-108 depicted in FIGS. 1A-1B, where the devices may be configured to communicate with each other via one or more communication links (e.g., wireless Bluetooth communication links, etc.). Furthermore, the process 600 may configure the respective devices to operate in the listening mode via a low-power, always-on mode so that the devices may provide continuous low-latency recognition of audio signals while in a reduced power consumption state.

In the following embodiments, the devices may enter the listening mode to continuously monitor for the one or more voice commands having one or more particular phrases (or words), contact names, and/or voice messages. The particular phrases may include, by way of non-limiting example, wake phrases, answer phrases, and stop phrases. For example, the wake phrases may include general wake phrases such as "Hello", "Talk to", etc., and/or personalized wake phrases such as "Connect with", "Hit up", etc., where each of the general and personalized wake phrases may be used as a wake signal for the respective devices.

Furthermore, as described above and in the following embodiments, any of the various types of phrases may be followed by a contact name ("Jonathan"), including the wake phrase "Hello Jonathan," the answer phrase "Answer Jonathan," the stop phrase "Goodbye Jonathan," and so on. In some embodiments, the name "Jonathan" may be a contact name of a user that is stored in a predefined list of contact names, which may be referred to as a contact list having one or more data entries such as names, contact information, and so on. Lastly, any of the various types of phrases and contact names may be followed by one or more voice messages, such as "Hello Jonathan—Want to get lunch," "Answer Jonathan—Want to get lunch," "Goodbye Jonathan—See you at lunch," and so on.

At block 610, the process 600 may determine whether a wake phrase has been detected from a voice command received from an audio signal captured by a first personal device and spoken by a first user. For example, the process 600 may identify the received voice command ("Talk to Susan") and may process the detected wake phrase ("Talk to") followed by the contact name ("Susan") from the received voice command against the user data associated with the first user. At block 620, in response to the wake phrase ("Talk to") being detected, the process 600 may determine whether the contact name ("Susan") matches an entry in a contact list associated with the first user. As shown in FIG. 6, it should be understood that the contact name may be recognized and/or matched by processing the detected wake phrase signal through a separate recognition network to determine whether the respective contact name ("Susan") matches an entry in the contact list. However, it should be understood that the recognizing/matching of the contact name in the contact list and/or the processing of the detected wake phrase signal against the user data of the first user may be done sequentially or in parallel with the detecting of the wake phrase signal from the received audio signal at block 610.

At block 630, in response to the contact name being matched with the entry in the contact list of the first user, the process 600 may initiate (or begin) a conversation via a communication link between the first user and the matched contact name of the respective user (i.e., the second user). Conversely, in response to not detecting the wake phrase and/or not being able to match the contact name with any entries of the contact list of the first user, the process 600 may proceed to block 640 and may determine whether a wireless communication (or voice) message has been received from the received audio signal. For example, as described above, the process 600 may determine whether the first personal device of the first user has received a voice message from the second user. At block 650, in response to determining that the wireless voice message was received, the process 600 may alert the first user of the received wireless voice message from the second user. For example, the process 600 may alert the first user that the second user ("Susan") has transmitted the following received voice message: "Are we still on for lunch."

At block 660, once the first user has been alerted of the received voice message from the second user, the process 600 may determine whether an answer phrase has been detected from a response voice command received from another audio signal captured by the first device of the first user. For example, similar to the determination depicted at block 610, the process 600 may identify the received response voice command ("Answer Susan—Sure, in five minutes") and may process the detected answer phrase ("Answer") followed by the contact name ("Susan") from the received response voice command against the user data associated with the first user. Accordingly, at block 630, in response to the answer phrase ("Answer") being detected by the first device of the first user, the process 600 may initiate a conversation via a communication link between the first user and the second user.

At block 630, in response to detecting the wake phrase followed by the matched contact name depicted in blocks 610 and 620 and/or detecting the answer phrase followed by the respective matched contact name depicted in block 660, the process 600 generates the communication link between the first and second personal computing devices of the first and second users, which allows the first and second users to directly communicate with each other effectively using continuous bi-directional audio data transmissions with minimal effort. For example, a communication link may provide a smoother interaction between users by emulating the communication experience of being physically proximate. Additionally, the communication link may also be used by users when there is no cellular service available, for example, implementing a direct peer-to-peer wireless voice communication between the users with no cellular service limitations, obstacles, and so on. The communication link may also facilitate a communication experience for users that is less bulky and requires no tactile interactions with their respective computing devices, for example, as compared to walkie-talkies or the like that are generally large and rarely carried outside of their specific user communities, such as worksite employees or the like. Moreover, the communication link may further provide users a more natural communication style that includes the non-textual information contained in voice tone, prosody, and so on, and may also utilize one or more voice commands so that each user's visual attention remains present in their respective environments without looking down or the like (e.g., inside of a user's car).

Continuing now with the remaining depicted operations, at block 670, the process 600 may maintain the bi-directional audio signal transmission between the first and second users until either users transmits and/or receives a stop phrase and/or the like. At block 680, the process 600 may determine whether a stop phrase has been detected from a voice command received/transmitted via the communication link between the first and second users. For example, in response to determining that no stop phrase has been detected, the process 600 may proceed back to block 670 to maintain the continuous bi-directional audio data transmissions between the first and second users. However, the process 600 may detect a response voice command "Goodbye Bill" that was transmitted by the second user to the first user, where the response voice command has been processed to detect the stop phrase: "Goodbye." As such, in response the stop phrase being detected, the process 600 may proceed to end the conversation link and audio data transmissions between the first and second users. Furthermore, in some embodiments as shown in FIG. 6, the process 600 may end the respective conversation between the first and second users and may then proceed back to block 605 to resume monitoring in the listening mode for new voice commands. Similarly, at block 690, in response to no answer phrases being detected at block 660 and/or no voice messages being received at block 640, the process 600 may resume waiting and monitoring and may return back to block 605 to resume monitoring in the listening mode for new voice commands.

Information as shown and described in detail herein is fully capable of attaining the above-described objective(s) of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail may be made, without departing from the spirit and scope of the present disclosure, as set forth in the appended claims, as might be apparent to those of ordinary skill in the art, are also encompassed by the present disclosure.

What is claimed is:

1. A voice-based peer-to-peer (P2P) communication computing device, comprising:
   an input/output (I/O) source;
   a processor communicatively coupled to the I/O source; and
   a memory communicatively coupled to the processor, the memory comprising:
   a signal monitoring logic configured to receive signal data from the I/O source;
   a voice command detector logic configured to identify one or more voice commands from the received signal data;
   a voice command processing logic configured to process the identified voice commands to extract at least one or more of phrases, users, and communication commands;
   a communication logic configured to generate a communication link with a second voice-based P2P communication computing device in response to the extracted voice commands having a particular phrase followed by a particular contact name, wherein the particular extracted voice commands are transmitted over the generated communication link; and
   in response to the particular contact name being matched with an entry in a contact list of a first user, initiating a conversation via the communication link between the first user and the matched contact name of the second user.

2. The device of claim 1, wherein each of the voice-based P2P communication computing device and the second voice-based P2P communication computing device comprise at least one or more of earphones, voice-based sunglasses, wearable devices, smart hearables, head mounted displays, gaming consoles, mobile computing devices, computing tablets, and voice-based speakers.

3. The device of claim 1, wherein the I/O source is configured to monitor for the identified voice commands from a first user, wherein the voice command processing logic is further configured to process the identified voice commands to generate audio data based on the processed voice commands, and wherein the generated audio data comprises at least one or more of phrase data with the phrases, user data with the users, and communication data with the communication commands.

4. The device of claim 3, wherein the phrase data comprises at least one of a wake phrase, an answer phrase, and a stop phrase, wherein the one or more identified voice commands comprise at least one or more particular phrases, contact names, and voice messages associated with the first user, wherein the processed particular phrase from the one or more identified voice commands is a wake phrase, and wherein the processed wake phrase from the one or more identified voice commands is associated with and spoken by the first user.

5. The device of claim 4, wherein the wake phrase and particular contact name are associated with the one or more particular phrases and contact names of the first user.

6. The device of claim 4, wherein the particular contact name matches a particular entry in a predetermined contact list associated with the particular contact names of the first user.

7. The device of claim 6, wherein the matched particular contact name is associated with a second user that is associated with the second voice-based P2P communication computing device.

8. The device of claim 7, wherein the transmitted voice commands are transmitted from the voice-based P2P communication computing device of the first user to the second voice-based P2P communication computing device of the second user via the generated transmission link, and wherein the transmitted voice commands include a first voice message spoken by the first user.

9. The device of claim 8, wherein the signal monitoring logic is further configured to receive a second signal data transmitted by the respective communication computing device of the second user via the generated communication link, and wherein the voice command detector logic is further configured to identify a second voice command from the received second signal data.

10. The device of claim 9, wherein the memory further comprises an alert logic configured to provide an alert to the first user based on the identified second voice command from the second user.

11. The device of claim 10, wherein the voice command processing logic is further configured to process the identified second voice command, and wherein the processed second voice command includes at least one or more of the answer phrase followed by both the respective contact name of the first user and a second voice message spoken by the second user, and the stop phrase followed by the respective contact name of the first user, and wherein the stop phrase is associated with a predetermined action that is configured to terminate the generated communication link.

12. The device of claim 3, wherein the memory further comprises a translation logic that is configured to translate one or more of the identified voice commands associated with the first user from a first language to a second language.

13. The device of claim 1, wherein the voice-based P2P communication computing device operates in a low-power, always-on mode, such that the voice-based P2P communication computing device remains continuously ready to receive the signal data.

14. The method of claim 13, further comprising:
generating first audio data based on the processed first voice command, wherein the generated audio data comprises at least one or more of phrase data, user data, and communication data; and
translating the identified first voice command from a first language to a second language.

15. The method of claim 13, further comprising receiving a second signal data transmitted by the second communication computing device of the second user via the generated communication link, wherein a second voice command is further identified from the received second signal data.

16. The method of claim 15, further comprising transmitting an alert to the first user based on the identified second voice command received from the second user.

17. The method of claim 16, further comprising processing the identified second voice command to detect at least one or more of an answer phrase followed by both a second contact name and a second voice message spoken by the second user, and a stop phrase followed by the second contact name, wherein the second contact name is associated with the first user, and wherein the stop phrase is associated with a predetermined action that is configured to terminate the generated communication link.

18. A method for generating peer-to-peer audio data transmissions, comprising:
receiving a first signal data from a first communication computing device associated with a first user;
identifying a first voice command from the received first signal data;
detecting a wake phrase, a first contact name, and a first voice message from the identified first voice command, wherein the wake phrase is respectively followed by both the first contact name and voice message;
processing the at least one or more of the detected wake phrase, first contact name, and first voice message from the identified first voice command against user data associated with the first user;
determining that the processed first contact name matches a particular entry in a predetermined contact list within the user data of the first user;
generating, in response to the processed voice command having the wake phrase followed by the matched contact name associated with a second user, a communication link between the first communication computing device of the first user and a second communication computing device of the second user;
transmitting the processed voice command to the second communication computing device of the second user via the generated communication link; and
in response to the particular contact name being matched with an entry in a contact list of a first user, initiating a conversation via the communication link between the first user and the matched contact name of the second user.

19. The method of claim 18, wherein the first and second communication computing devices comprise at least one or more of earphones, voice-based sunglasses, wearable devices, smart hearables, head mounted displays, gaming consoles, mobile computing devices, computing tablets, and voice-based speakers.

20. A system for generating peer-to-peer audio data transmissions, comprising:
a first voice-based P2P communication computing device; and
a second voice-based P2P communication computing device, wherein the first and second voice-based P2P communication computing devices having first and second I/O sources, wherein each of the first and second I/O sources is communicatively coupled to a processor, and wherein the processor is communicatively coupled to a memory; and
wherein the memory comprising:
a signal monitoring logic configured to receive a first signal data from the first communication computing device;
a voice command detector logic configured to identify a first voice command from the received first signal data;
a voice command processing logic configured to:
detect a wake phrase, a first contact name, and a first voice message from the identified first voice command, wherein the wake phrase is respectively followed by both the first contact name and voice message;
process the at least one or more of the detected wake phrase, first contact name, and first voice message from the first voice command against user data associated with a first user; and
determine that the processed first contact name matches a particular entry in a predetermined contact list within the user data of the first user; and a communication logic configured to:
  generate, in response to the processed voice command having the wake phrase followed by the matched contact name associated with a second user, a communication link between the first communication computing device of the first user and the second communication computing device of the second user; and
  transmit the processed first voice command to the second communication computing device of the second user via the generated communication link; and
  in response to the particular contact name being matched with an entry in a contact list of a first user, initiating a conversation via the communication link between the first user and the matched contact name of the second user.

* * * * *